US012643709B2

(12) United States Patent
Austrheim et al.

(10) Patent No.: US 12,643,709 B2
(45) Date of Patent: Jun. 2, 2026

(54) STORAGE CONTAINER, A SYSTEM COMPRISING ONE OR MORE OF THE STORAGE CONTAINERS AND METHODS OF ASSEMBLING THE STORAGE CONTAINERS

(71) Applicant: Autostore Technology AS, Nedre Vats (NO)

(72) Inventors: Trond Austrheim, Etne (NO); Ivar Fjeldheim, Haugesund (NO); Simen Aarseth, Stavanger (NO); Magne Hatteland, Stavanger (NO)

(73) Assignee: AutoStore Technology AS, Nedre Vats (NO)

( * ) Notice: Subject to any disclaimer, the term of this patent is extended or adjusted under 35 U.S.C. 154(b) by 366 days.

(21) Appl. No.: 18/262,042

(22) PCT Filed: Jan. 21, 2022

(86) PCT No.: PCT/EP2022/051327
§ 371 (c)(1),
(2) Date: Jul. 19, 2023

(87) PCT Pub. No.: WO2022/161863
PCT Pub. Date: Aug. 4, 2022

(65) Prior Publication Data
US 2024/0092529 A1 Mar. 21, 2024

(30) Foreign Application Priority Data

Jan. 27, 2021 (NO) .................................... 20210106

(51) Int. Cl.
B65D 21/02 (2006.01)
B65D 1/04 (2006.01)
(Continued)

(52) U.S. Cl.
CPC ...... B65D 11/1833 (2013.01); B65D 21/0213 (2013.01); B65D 21/068 (2013.01);
(Continued)

(58) Field of Classification Search
CPC ....................... B65D 11/1833; B65D 21/0213; B65D 25/22; B65G 1/0464; B65G 1/0492
See application file for complete search history.

(56) References Cited

U.S. PATENT DOCUMENTS 3,415,585 A * 12/1968 Morris ................. G11B 23/027
3,508,698 A * 4/1970 Shultz ...................... B65D 5/68
229/123.1
(Continued)

FOREIGN PATENT DOCUMENTS

CN 103502104 A 1/2014
CN 110182480 A 8/2019
(Continued)

OTHER PUBLICATIONS

International Search Report issued in PCT/EP2022/051327 on Apr. 8, 2022 (5 pages).
(Continued)

*Primary Examiner* — Saul Rodriguez
*Assistant Examiner* — Ashley K Romano
(74) *Attorney, Agent, or Firm* — Baker Botts L.L.P.

(57) ABSTRACT

A storage container, which is for an automated storage and retrieval system (ASRS), is configured to be stacked in a stack of storage containers where an underlying storage container supports the storage container(s) positioned above. The storage container is adapted to be lifted by grippers on a lifting device such that the storage container can be lifted from above. The storage container includes a base, four sides, and four corner posts. The four sides are each hingedly connected to an edge of the base. The four corner posts are
(Continued)

each configured to interconnect a pair of adjacent sides to each other in a horizontal direction when the sides are positioned substantially 90 degrees relative the base and relative each other.

31 Claims, 19 Drawing Sheets

(51) Int. Cl.

| | | |
|---|---|---|
| *B65D 6/18* | (2006.01) | |
| *B65D 21/06* | (2006.01) | |
| *B65D 25/22* | (2006.01) | |
| *B65G 1/04* | (2006.01) | |

(52) U.S. Cl.
CPC ........... *B65D 25/22* (2013.01); *B65G 1/0464* (2013.01); *B65G 1/0492* (2013.01)

(56) References Cited

U.S. PATENT DOCUMENTS

| | | | | |
|---|---|---|---|---|
| 4,210,274 | A | 7/1980 | Leonard | |
| 5,752,648 | A | 5/1998 | Quaintance | |
| 6,349,877 | B1 | 2/2002 | Bradford | |
| 6,654,662 | B1 | 11/2003 | Hognaland | |
| 7,314,147 | B2 * | 1/2008 | DeCarlo | B65D 11/1833 220/592.27 |
| 12,269,656 | B2 * | 4/2025 | Holley, Jr. | B65D 81/02 |
| 2005/0029261 | A1 * | 2/2005 | Sheng-Bin | A45C 7/0036 220/9.1 |
| 2008/0169284 | A1 * | 7/2008 | Haimoff | B65D 11/1893 220/4.28 |
| 2013/0015090 | A1 | 1/2013 | Bates et al. | |
| 2015/0298856 | A1 | 10/2015 | Shiotani et al. | |
| 2017/0073106 | A1 * | 3/2017 | Dimer | B65D 5/28 |
| 2020/0255222 | A1 | 8/2020 | Rossano et al. | |
| 2021/0229911 | A1 | 7/2021 | Austrheim | |
| 2024/0140647 | A1 * | 5/2024 | Lopez Uran | B65D 43/0202 |
| 2025/0108956 | A1 * | 4/2025 | Blumenthal | B65D 11/20 |

FOREIGN PATENT DOCUMENTS

| | | |
|---|---|---|
| CN | 111547429 A | 8/2020 |
| CN | 112262091 A | 1/2021 |
| DE | 2824700 A1 | 12/1979 |
| EP | 1671887 A1 | 6/2006 |
| FR | 1570685 A | 6/1969 |
| JP | S4726983 Y1 | 8/1972 |
| JP | S5191232 U | 7/1976 |
| JP | S54130281 A | 10/1979 |
| JP | H09272531 A | 10/1997 |
| JP | 2000025755 A | 1/2000 |
| JP | 2003535774 A | 12/2003 |
| JP | 2006219185 A | 8/2006 |
| JP | 2009-73597 A | 4/2009 |
| JP | 2012522690 A | 9/2012 |
| JP | 2014133591 A | 7/2014 |
| JP | 2018516821 A | 6/2018 |
| NO | 317366 B1 | 10/2004 |
| WO | 98/49075 A1 | 11/1998 |
| WO | 0194214 A1 | 12/2001 |
| WO | 2010111729 A1 | 10/2010 |
| WO | 2014/075937 A1 | 5/2014 |
| WO | 2014/090684 A1 | 6/2014 |
| WO | 2015/193278 A1 | 12/2015 |
| WO | 2016166354 A1 | 10/2016 |
| WO | 2018/146304 A1 | 8/2018 |
| WO | 2019206487 A1 | 10/2019 |
| WO | 2019238694 A1 | 12/2019 |
| WO | 2019238697 A1 | 12/2019 |

OTHER PUBLICATIONS

Written Opinion of the International Searching Authority issued in PCT/EP2022/051327 on Apr. 8, 2022 (7 pages).

Norwegian Search Report issued in No. 20210106, mailed on Aug. 27, 2021 (2 pages).

Chi, Yanfei, Office Action in CN202280011665.5, mailed Jun. 17, 2025, 22 pages, The State Intellectual Property Office of the People's Republic of China, Beijing, China.

Anh, Le Huy, Office Action in VN1202305023, mailed Jul. 9, 2025, 4 pages, Intellectual Property Office of Vietnam, Hanoi, Vietnam.

Anonymous, Office Action in KR1020237028438, mailed Dec. 11, 2025, 27 pages, Korean Intellectual Property Office, Daejeon, Korea.

Uchida, Hiroyuki, Office Action in JP2023544282, mailed Nov. 11, 2025, 17 pages, Japan Patent Office, Tokyo, Japan.

\* cited by examiner

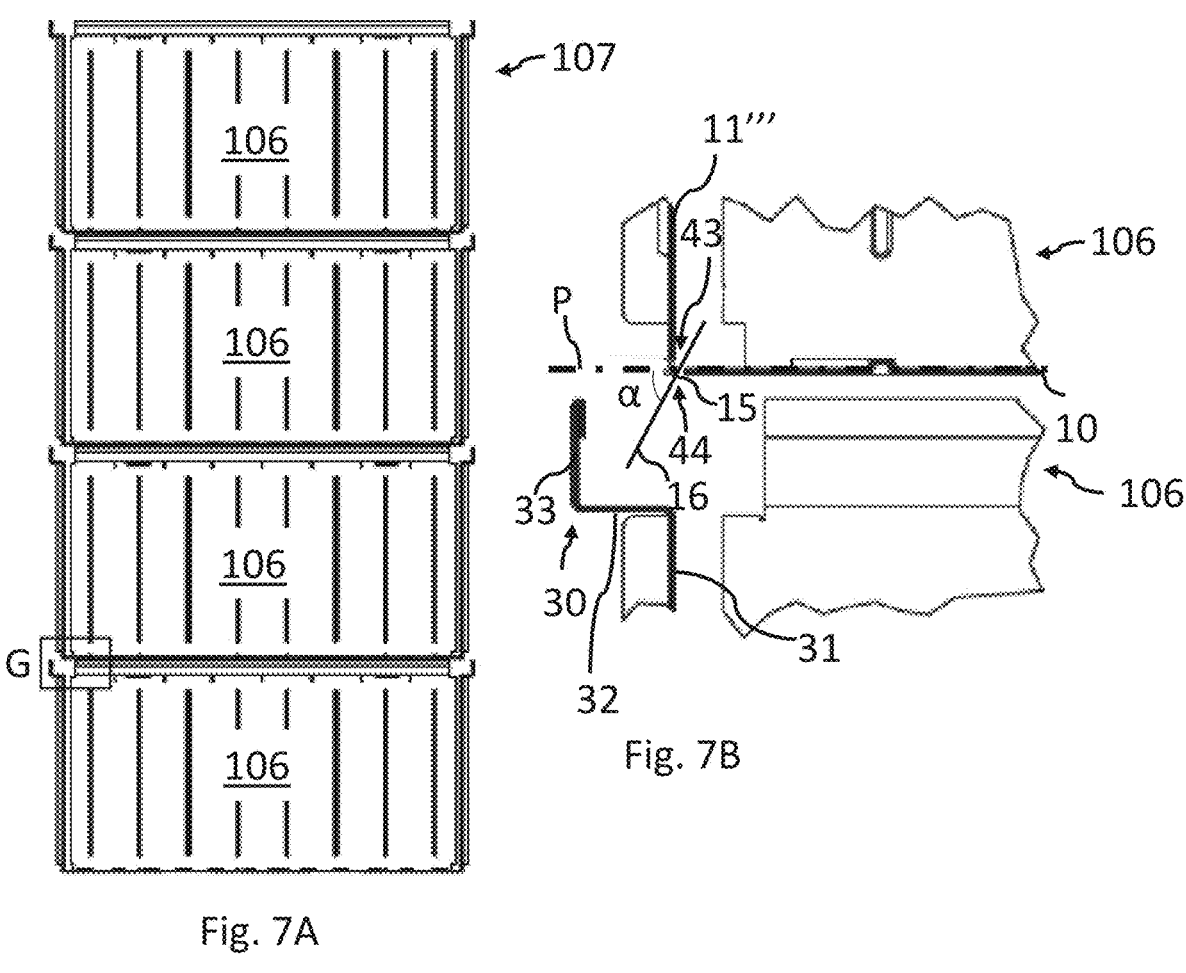
Fig. 7A
Fig. 7B
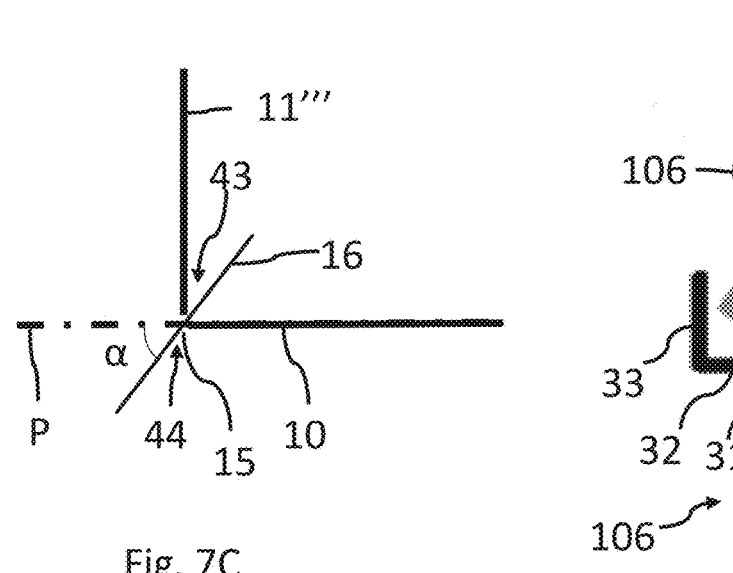
Fig. 7C
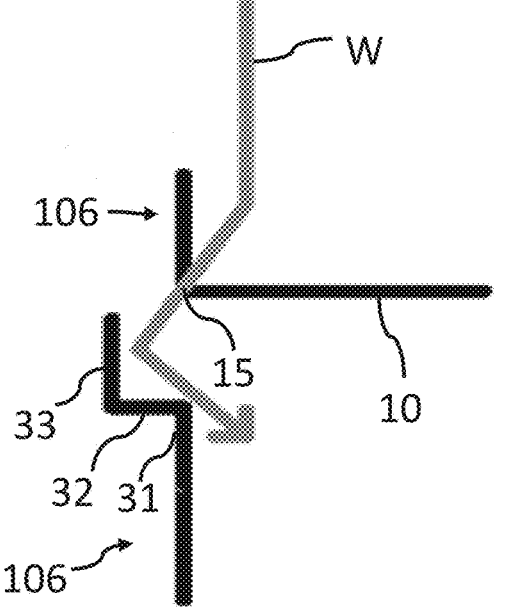
Fig. 7D

STORAGE CONTAINER, A SYSTEM COMPRISING ONE OR MORE OF THE STORAGE CONTAINERS AND METHODS OF ASSEMBLING THE STORAGE CONTAINERS

FIELD OF THE INVENTION

The present invention relates to an automated storage and retrieval system for storage and retrieval of containers, in particular to a fire-resistant storage container, a system comprising one or more of the storage containers and methods of assembling the storage containers. The storage container is in particular suitable for use in Automated Storage and Retrieval Systems (ASRS) where the storage containers are stacked one on top of the other forming stacks and where the storage containers are retrievable by container handling vehicles or robots operating on a rail system extending in a first direction X and a perpendicular second direction Y.

BACKGROUND AND PRIOR ART

FIG. 1 discloses a typical prior art automated storage and retrieval system 1 with a framework structure 100 and FIGS. 2 and 3 disclose two different prior art container handling vehicles 201, 301 suitable for operating on such a system 1.

The framework structure 100 comprises upright members 102, horizontal members 103 and a storage volume comprising storage columns 105 arranged in rows between the upright members 102 and the horizontal members 103. In these storage columns 105 storage containers 106, also known as bins, are stacked one on top of one another to form stacks 107. The members 102, 103 may typically be made of metal, e.g. extruded aluminum profiles.

The framework structure 100 of the automated storage and retrieval system 1 comprises a rail system 108 arranged across the top of framework structure 100, on which rail system 108 a plurality of container handling vehicles 201, 301 are operated to raise storage containers 106 from, and lower storage containers 106 into, the storage columns 105, and also to transport the storage containers 106 above the storage columns 105. The rail system 108 comprises a first set of parallel rails 110 arranged to guide movement of the container handling vehicles 201, 301 in a first direction X across the top of the frame structure 100, and a second set of parallel rails 111 arranged perpendicular to the first set of rails 110 to guide movement of the container handling vehicles 201, 301 in a second direction Y which is perpendicular to the first direction X. Containers 106 stored in the columns 105 are accessed by the container handling vehicles through access openings 112 in the rail system 108. The container handling vehicles 201, 301 can move laterally above the storage columns 105, i.e. in a plane which is parallel to the horizontal X-Y plane.

The upright members 102 of the framework structure 100 may be used to guide the storage containers during raising of the containers out from and lowering of the containers into the columns 105. The stacks 107 of containers 106 are typically self-supportive.

Each prior art container handling vehicle 201, 301 comprises a vehicle body 201a, 301a, and first and second sets of wheels 201b, 301b, 201c, 301c which enable the lateral movement of the container handling vehicles 201, 301 in the X direction and in the Y direction, respectively. In FIGS. 2 and 3 two wheels in each set are fully visible. The first set of wheels 201b, 301b is arranged to engage with two adjacent rails of the first set 110 of rails, and the second set of wheels 201c, 301c is arranged to engage with two adjacent rails of the second set 111 of rails. At least one of the sets of wheels 201b, 301b, 201c, 301c can be lifted and lowered, so that the first set of wheels 201b, 301b and/or the second set of wheels 201c, 301c can be engaged with the respective set of rails 110, 111 at any one time.

Each prior art container handling vehicle 201, 301 also comprises a lifting device (not shown) for vertical transportation of storage containers 106, e.g. raising a storage container 106 from, and lowering a storage container 106 into, a storage column 105. The lifting device comprises one or more gripping/engaging devices which are adapted to engage a storage container 106, and which gripping/engaging devices can be lowered from the vehicle 201, 301 so that the position of the gripping/engaging devices with respect to the vehicle 201, 301 can be adjusted in a third direction Z which is orthogonal the first direction X and the second direction Y. Parts of the gripping device of the container handling vehicle 301 are shown in FIG. 3 indicated with reference number 304. The gripping device of the container handling device 201 is located within the vehicle body 201a in FIG. 2.

Conventionally, and also for the purpose of this application, Z=1 identifies the uppermost layer of storage containers, i.e. the layer immediately below the rail system 108, Z=2 the second layer below the rail system 108, Z=3 the third layer etc. In the exemplary prior art disclosed in FIG. 1, Z=8 identifies the lowermost, bottom layer of storage containers. Similarly, X=1 . . . n and Y=1 . . . n identifies the position of each storage column 105 in the horizontal plane. Consequently, as an example, and using the Cartesian coordinate system X, Y, Z indicated in FIG. 1, the storage container identified as 106' in FIG. 1 can be said to occupy storage position X=10, Y=2, Z=3. The container handling vehicles 201, 301 can be said to travel in layer Z=0, and each storage column 105 can be identified by its X and Y coordinates.

The storage volume of the framework structure 100 has often been referred to as a grid 104, where the possible storage positions within this grid are referred to as storage cells. Each storage column may be identified by a position in an X- and Y-direction, while each storage cell may be identified by a container number in the X-, Y- and Z-direction.

Each prior art container handling vehicle 201, 301 comprises a storage compartment or space for receiving and stowing a storage container 106 when transporting the storage container 106 across the rail system 108. The storage space may comprise a cavity arranged centrally within the vehicle body 201a as shown in FIG. 2 and as described in e.g. WO2015/193278A1, the contents of which are incorporated herein by reference.

FIG. 3 shows an alternative configuration of a container handling vehicle 301 with a cantilever construction. Such a vehicle is described in detail in e.g. NO317366, the contents of which are also incorporated herein by reference.

The central cavity container handling vehicles 201 shown in FIG. 2 may have a footprint that covers an area with dimensions in the X and Y directions which is generally equal to the lateral extent of a storage column 105, e.g. as is described in WO2015/193278A1, the contents of which are incorporated herein by reference.

The term 'lateral' used herein may mean 'horizontal'.

Alternatively, the central cavity container handling vehicles 101 may have a footprint which is larger than the lateral area defined by a storage column 105, e.g. as is disclosed in WO2014/090684A1.

The rail system 108 typically comprises rails with grooves in which the wheels of the vehicles run. Alternatively, the rails may comprise upwardly protruding elements, where the wheels of the vehicles comprise flanges to prevent derailing. These grooves and upwardly protruding elements are collectively known as tracks. Each rail may comprise one track, or each rail may comprise two parallel tracks.

WO2018/146304, the contents of which are incorporated herein by reference, illustrates a typical configuration of rail system 108 comprising rails and parallel tracks in both X and Y directions.

In the framework structure 100, a majority of the columns 105 are storage columns 105, i.e. columns 105 where storage containers 106 are stored in stacks 107. However, some columns 105 may have other purposes. In FIG. 1, columns 119 and 120 are such special-purpose columns used by the container handling vehicles 201, 301 to drop off and/or pick up storage containers 106 so that they can be transported to an access station (not shown) where the storage containers 106 can be accessed from outside of the framework structure 100 or transferred out of or into the framework structure 100. Within the art, such a location is normally referred to as a 'port' and the column in which the port is located may be referred to as a 'port column' 119, 120. The transportation to the access station may be in any direction, that is horizontal, tilted and/or vertical. For example, the storage containers 106 may be placed in a random or dedicated column 105 within the framework structure 100, then picked up by any container handling vehicle and transported to a port column 119, 120 for further transportation to an access station. Note that the term 'tilted' means transportation of storage containers 106 having a general transportation orientation somewhere between horizontal and vertical.

In FIG. 1, the first port column 119 may for example be a dedicated drop-off port column where the container handling vehicles 201, 301 can drop off storage containers 106 to be transported to an access or a transfer station, and the second port column 120 may be a dedicated pick-up port column where the container handling vehicles 201, 301 can pick up storage containers 106 that have been transported from an access or a transfer station.

The access station may typically be a picking or a stocking station where product items are removed from or positioned into the storage containers 106. In a picking or a stocking station, the storage containers 106 are normally not removed from the automated storage and retrieval system 1, but are returned into the framework structure 100 again once accessed. A port can also be used for transferring storage containers to another storage facility (e.g. to another framework structure or to another automated storage and retrieval system), to a transport vehicle (e.g. a train or a lorry), or to a production facility.

A conveyor system comprising conveyors is normally employed to transport the storage containers between the port columns 119, 120 and the access station.

If the port columns 119, 120 and the access station are located at different levels, the conveyor system may comprise a lift device with a vertical component for transporting the storage containers 106 vertically between the port column 119, 120 and the access station.

The conveyor system may be arranged to transfer storage containers 106 between different framework structures, e.g. as is described in WO2014/075937A1, the contents of which are incorporated herein by reference.

When a storage container 106 stored in one of the columns 105 disclosed in FIG. 1 is to be accessed, one of the container handling vehicles 201, 301 is instructed to retrieve the target storage container 106 from its position and transport it to the drop-off port column 119. This operation involves moving the container handling vehicle 201, 301 to a location above the storage column 105 in which the target storage container 106 is positioned, retrieving the storage container 106 from the storage column 105 using the container handling vehicle's 201, 301 lifting device (not shown), and transporting the storage container 106 to the drop-off port column 119. If the target storage container 106 is located deep within a stack 107, i.e. with one or a plurality of other storage containers 106 positioned above the target storage container 106, the operation also involves temporarily moving the above-positioned storage containers prior to lifting the target storage container 106 from the storage column 105. This step, which is sometimes referred to as "digging" within the art, may be performed with the same container handling vehicle that is subsequently used for transporting the target storage container to the drop-off port column 119, or with one or a plurality of other cooperating container handling vehicles. Alternatively, or in addition, the automated storage and retrieval system 1 may have container handling vehicles 201, 301 specifically dedicated to the task of temporarily removing storage containers 106 from a storage column 105. Once the target storage container 106 has been removed from the storage column 105, the temporarily removed storage containers 106 can be repositioned into the original storage column 105. However, the removed storage containers 106 may alternatively be relocated to other storage columns 105.

When a storage container 106 is to be stored in one of the columns 105, one of the container handling vehicles 201, 301 is instructed to pick up the storage container 106 from the pick-up port column 120 and transport it to a location above the storage column 105 where it is to be stored. After any storage containers 106 positioned at or above the target position within the stack 107 have been removed, the container handling vehicle 201, 301 positions the storage container 106 at the desired position. The removed storage containers 106 may then be lowered back into the storage column 105, or relocated to other storage columns 105.

For monitoring and controlling the automated storage and retrieval system 1, e.g. monitoring and controlling the location of respective storage containers 106 within the framework structure 100, the content of each storage container 106, and the movement of the container handling vehicles 201, 301 so that a desired storage container 106 can be delivered to the desired location at the desired time without the container handling vehicles 201, 301 colliding with each other, the automated storage and retrieval system 1 comprises a control system 500 which typically is computerized and which typically comprises a database for keeping track of the storage containers 106.

Normally, the building or sites where the ASRS are installed are equipped with sprinkler systems in the event of fire. Such sprinkler systems are usually roof-mounted and represent a costly investment. In particular, in smaller ASRS, such as micro-fulfillment systems with a limited amount of storage positions for storage containers or bins as well as a limited number of container handling vehicles, the regulatory demands for an expensive sprinkler system fire may constitute a significant portion of the investment cost for the overall ASRS. In some cases, the cost of the sprinkler system may result in that a planned ASRS is not installed.

An objective of the invention is to be able to store the containers for delivery to the micro-fulfillment ASRS installations.

SUMMARY OF THE INVENTION

The present invention is set forth and characterized in the independent claims, while the dependent claims describe other characteristics of the invention.

This invention relates to a storage container. The storage container is preferably of the same size and can be operated by container handling vehicles as referred to under 'Background and prior art'.

It is described a storage container for an automated storage and retrieval system (ASRS), the storage container being configured to be stacked in a stack of storage containers where an underlying storage container supports the storage container(s) positioned above, the storage container being adapted to be lifted by grippers on a lifting device such that the storage container can be lifted from above, wherein the storage container comprises: a base; four sides, each hingedly connected to an edge of the base; four corner posts, each configured to interconnect a pair of adjacent sides to each other in a horizontal direction when the sides are positioned substantially 90 degrees relative the base and relative each other.

This means that two adjacent sides are locked to each other and prevented from moving relative to each other in a horizontal direction when the base of the storage container is supported on a surface (i.e. during normal use of the storage container).

The base is preferably rectangular or square shaped.

The fact that each of the four sides are hingedly connected to an edge of the base implies that the sides are connected by a continuation of the base material. The five sides of the container may be provided by connected regions, where the hinged connection can be formed by e.g. one sheet with lines of weakness along which the sides are folded or, as separate sheets adjoined along the edges of the base etc.

The feature that the four corner posts, each configured to interconnect a pair of adjacent sides to each other in a horizontal direction when the sides are positioned substantially 90 degrees relative to the base and relative to each other, is to be understood as 90 degrees or +/−5 degrees.

In a preferred embodiment, the corner posts are structural posts, in the sense that they are configured to support all storage containers positioned above. In other words, the corner posts take up all or a majority of the weight from any storage container(s) positioned above. This can be achieved by manufacturing the corner posts of a relatively stiff material with high strength and adapting the configuration such that the corner posts, and not the sides, take up the vertical loads from the storage containers above. The configuration of the corner posts and the engagement of the sides with the post can be designed to lock the sides in place in their substantially 90 degree position when the storage container is assembled, thereby stabilizing the structure of the storage container. By doing this, the sides only have to be designed with a limited vertical strength which is sufficient to carry the load of the storage container in addition to any items therein (i.e. in the range of 30-40 kg maximum).

The storage container may comprise lifting holes along an upper edge thereof arranged both at appropriate positions as well as being of complementary size as the lifting device's grippers positions and size, thereby rendering possible lifting of the storage container by the grippers of the lifting device.

In order for a lowermost storage container in a stack of storage containers to be able to support e.g. 15 bins of maximum 30 kgs each, the corner posts shall be designed to take up at least 150 kgs each (providing a safety margin of 150 kg (4×150 kg=600 kg vs. max weight of stack 15 bins×30 kg=450 kg).

By designing the corner posts to take up all or a majority of the vertical loads from storage containers above, the sheet material of one storage container does not have to be dimensioned for taking up more loads than the storage container weight plus any contents therein (e.g. max 30 kg). Instead of transmitting vertical loads from storage containers above, the sheet material may act in tension to stabilize the position of the corner posts so that they can provide a primary load path of the vertical loads.

The base and sides of the storage container may comprise a sheet material, the sheet material may be provided as a blank from which the base and four sides have been formed, wherein each of the sides may be connected to a respective edge of the base by a live hinge provided by a line of weakness extending between each of the sides and the base such that the respective sides can be folded relative the base along the line of weakness. As such, the base and the sides can be made from the same material.

This render possible pre-fabrication of the sheet material and transporting the storage containers stacked one inside each other thereby reducing the required transportation volume significantly.

In addition, it is rendered possible to easily change the height of the bins by simply changing the size of the sides of the sheet material.

The sheet material can be manufactured using known techniques. For example, the sheet material can be punched or stamped.

In order to improve the strength of the sides, the sheet material may be provided with indentations extending in the vertical direction when the sides are folded upwards. The indentations are profiled (not through-going holes) in the sheet material. Similarly, the base can be provided with indentations. Alternatively, other means for increasing strength may be employed, such as increased thickness of the sides and/or base, mounting separate stiffeners to the sides and/or base etc.

A live hinge is a thin flexible hinge (flexure bearing) made from the same material as the two rigid pieces it connects. It is typically thinned or cut to allow the rigid pieces to bend along the line of the hinge.

The lines of weakness may be lines where an amount of the material of the sheet material has been reduced. The reduction in material may be formed through thinning or through providing holes, or both.

The relatively thinner parts of the sheet material along the lines of weakness forms relatively weaker zones in the sheet material and ensures that the bend or fold is formed along the desired lines of the sheet material. The lines of weakness are thus the folded edges of the base.

The lines of weakness may comprise through-going holes. The through-going holes may enable relatively weaker zones or lines in the sheet material and ensures that the bend is formed along the desired lines of the sheet material.

The through-going holes may make up more than 30% of the lines of weakness. Alternatively, the through-going holes may make up more or less than 30% of the lines of weakness, such as more than 20% and more than 40% of the lines of weakness.

In an aspect, a cross sectional area of the through-going holes may be of a sufficient size for water to flow therethrough. The through-going holes may be formed as slots, apertures or grooves of a sufficient size for water to exit therethrough through natural flow.

In an aspect, the through-going holes comprises:

an inlet arranged on an inner surface of the storage container; and an outlet arranged on an outer surface of the storage container. The inlet may be arranged at an elevation equal to or higher than the outlet of the through-going holes. This configuration ensures that a centerline of the through-going holes may extend horizontally or downwardly from an interior of the storage container and to an exterior of the storage container. I.e., a centerline of the through-going holes may be a fall-line which extends outwardly from the lines of weakness when the storage container is assembled.

As indicated above, the through-going holes can be arranged along the lines of weakness. Alternatively, or in addition, through-going holes can be made in the base close to or in the proximity of the lines of weakness. Arranging the through-going holes at these positions, may further ensure that water flowing therethrough enters into the underlying storage container in the stack. In order for most of the water to flow into the underlying storage container, and because the storage containers are stacked on top of each other (and not partly into each other) where at least the corner posts of stacked storage containers are supported on each other, a centerline of the through-going holes shall preferably form a negative angle relative a horizontal plane. For example, if the base is in a horizontal plane, the centerline of the through-going holes forms a negative angle relative the base).

The lines of weakness may be rectilinear lines. This ensures that the fold is made along a straight line. Rectilinear or straight lines ensures that the sides are bent along desired lines such that the final storage container fulfills requirements in terms of form and shape etc. At site, all storage containers are preferably tested in order to identify potential damages during transport as is standard procedure after transport of today's casted plastic containers. Irregular storage containers will not fit within the storage columns or stack of storage containers, and/or may become stuck in the columns and/or the grippers of the lifting device may struggle to grip the storage container.

The sheet material may be stamped to provide an outline of the base and the four sides. The lines of weakness may possibly be formed at the same time. The sides and the base of the storage container may be profiled in order to increase strength.

The base and sides may be formed from a metal sheet material, a plastic sheet material, a cardboard sheet material, a composite sheet material or other suitable material.

The base and sides may be formed from aluminium or steel.

In a preferred embodiment, manufacturing the storage container of fire-resistant material such as a metal or fire-resistant plastic, avoids expensive sprinkler systems in micro-fulfillment ASRS installations.

An upper end of the corner posts may be at the same level or above a top edge of the sides. Similarly, a lower end of the corner posts may be at the same level or below a lower end of the sides. Such an arrangement ensures that an upper end of the corner posts is in contact with an underside of corner post of a storage container above, which again ensures that all or a majority of the vertical load of the above storage container is supported by the corner posts.

The corner posts may be formed from a plastic material. For example, the corner posts may be moulded and may comprise a profile that is configured for engagement with the sides of the storage container.

The storage container according to any of the preceding claims, wherein the corner posts comprise a longitudinal indent on an exterior surface. The longitudinal, or vertical, indent assists in enabling that the storage container is able to be lifted by grippers on a lifting device in that bin guides of the lifting device can be guided along the indents on the different corner posts.

The corner posts may further be of a shape and material which simplify guiding along the upright members of the framework. As the upright members are often of aluminium, at least the surface of the corner posts which is in contact with the upright member shall be made of a different material than aluminium in order to prevent scratching. However, if the corner posts are made from aluminium, the surface in contact with the upright members may be coated or otherwise treated with a different material than aluminium.

Each of the sides may comprise a top edge and two opposed side edges, and each of the sides may have been folded forming a fold at the side edges to provide an outwardly extending rib at each side edge, and each corner post may comprise a pair of grooves extending in a longitudinal direction thereof for receiving the respective outwardly extending ribs from a pair of adjacent sides. This locks two neighboring side panels in a rectangular manner (i.e. perpendicular) relative each other.

The crease in the sheet material should work harden that region locally to provide additional strength—but also the fold provides a flange (or it could be formed into another shape, e.g., rolled) which extends at an angle (ideally perpendicular but other angles would still be quite effective) to the plane of the side. This creates a type of formation (a corner, rib, flange, plug or bead—bead in the case of a rolled edge, etc.) which is then locked in the longitudinal, i.e. vertical, groove of the corner post as it is slid into engagement, in this way being able to resist any tension or hoop forces in the container urging the sides apart.

A distance between the side edges of one side may be shorter than the distance between two edges of the base. As such, the adjoining side edges of the adjacent sides may finish short of the true geometrical corners of an interior of the storage container. The corner posts can secure to those edges and provide a structural bridge for the hoop forces to pass from one of the sides to the other. In addition, the corner posts secure the sides in a spaced apart configuration.

The top edge may form part of a flange portion of the sides, and the corner post may comprise a snap lock connection for locking the corner post to the flange portion.

The flange portion may comprise a main portion, an intermediate portion and an outer portion, and the top edge may form the upper end of the outer portion.

The intermediate portion may be folded outwardly relative the main portion and the outer portion has been folded upwardly relative the intermediate portion, such that the outer portion is staggered relative the main portion. This configuration strengthens the sides as they are stiffened by the flange portion. As such, the risk of buckling of the storage container is reduced.

The main portion and the outer portion are preferably substantially parallel.

A cross sectional area formed by the outer portions of the sides may be larger in all directions than the base and consequently the through-going holes of the base of a storage container supported directly above, such that any water flowing through the through-going holes of the storage container above is guided into the storage container via the outer portion, the intermediate portion and the main portion of the flange portion. In other words, the outer portion of the flange portion at the top of the sides projects out to guide water coming out of the through-going holes used to form the lines of weakness of the storage container above. I.e. the through-going holes both have a function in forming the lines of weakness and in guiding water down through an underlying storage container in the event of fire. As such, the outer portions of the sides may be arranged beyond, in all horizontal directions, any through-going holes of a storage container supported directly above.

The length of the sides in the X and Y directions are preferably longer than the distance between two upright members in the X and the Y directions. This enables that the position of the side edges of the sides of the storage container relative the upright members of the framework of the ASRS, are such that, in case the corner posts melts during an event of fire and one or more of the four sides, as a consequence of not being supported by the corner post anymore, move outwards, the sides will lean against the upright members. This will retain most of the integrity and stability of the stack of storage containers and prevent the stack from collapsing. This may be particularly important in an ASRS's using storage containers where the base and the sides are made of a fire-proof material (e.g. metal) while the corner posts are not made of a fire-proof material (e.g. plastic). The combination of sides made of metal (such as aluminum or steel) and water may be particularly advantageous because aluminium is a great conductor of heat and water has a high specific heat capacity, so together they can work well to draw significant amounts of heat from burning regions to help prevent the spread of fire. As such, the combination of aluminium and water may provide more benefit than just being incombustible, at least at comparatively low fire temperatures where aluminium doesn't burn.

In an embodiment, when the top edge has been folded forming a folded portion, the storage container 106 may further comprise a closed locking frame for locking all of the top edges of the sides and the corner posts relative each other.

The top edges and the corner posts may comprise recesses having their opening oriented upwards and the locking frame may comprise complementary downwardly oriented protrusions for locking with the recesses. The locking between the recesses and the protrusions may be made through a snap lock connection.

In an alternative embodiment, the top edge may be folded, and the storage container may further comprise a closed locking frame for locking all of the top edges of the sides and the corner posts relative each other. In this embodiment, the closed locking frame comprises recesses having their opening oriented upwards.

It is further described and automated storage and retrieval system (ASRS) comprising a two-dimensional rail system comprising a first set of parallel rails arranged to guide movement of container handling vehicles in a first direction X across the top of a frame structure, and a second set of parallel rails arranged perpendicular to the first set of rails to guide movement of the container handling vehicles in a second direction Y which is perpendicular to the first direction X, wherein a plurality of container handling vehicles operate on the rail system, and wherein the system comprises one or more storage containers as defined above.

It is further described a method of transporting a storage container and assembling the storage container on-site, wherein the storage container comprises: a base; four sides, each hingedly connected to an edge of the base; four corner posts, each configured to interconnect a pair of adjacent sides to each other in a horizontal direction when the sides are positioned substantially 90 degrees relative the base and relative each other; and wherein the method comprises the steps of:

partially folding each of the sides relative to the base between 20 and 85 degrees;

stacking the partially folded sides and bases at least partly into or within each other on a common transport platform;

positioning the corner posts on a platform;

transporting stacks of partially folded sides and bases and the corner posts to a site of the ASRS;

assembling the storage containers on site.

The stacking of material sheets into or within each other render possible shipping the storage containers semi-manufactured such that final assembling can be made on site of the ASRS, reducing the required volume for transporting storage containers to up to a third compared to prior art solutions where the storage containers have been cast in one piece and transported one on top of the other from factory to ASRS installation site.

The assembling of the storage container on site can be performed by a human operator or a robotic operator.

The transport platform may be a standardized pallet, such as an EUR-pallet.

In an aspect of the method, each of the sides may comprise a top edge and two opposed side edges, and each of the sides may have been folded forming a fold at the side edges to provide an outwardly extending rib at each side edge, and each corner post may comprise a pair of grooves extending in a longitudinal direction thereof for receiving the respective outwardly extending ribs from a pair of adjacent sides, and the step of assembling the storage containers on site may comprise:

folding the sides fully so that each extend at 90 degrees from the base;

sliding each of the corner posts from above into locking engagement with edges of a pair of adjacent sides.

The top edge may form part of a flange portion of the sides, and the corner post may comprise a snap lock connection for locking the corner post to the flange portion, and the method may further comprise:

snap locking the corner posts to a flange portion of the storage container such as to bring the corner posts into the locking engagement with the edges of the adjacent sides.

In an aspect, when the top edge has been folded, and the storage container further comprises a closed locking frame for locking all of the top edges of the sides and the corner posts relative each other, the method may comprise the steps of:

locking the locking frame to the sides and the corner posts.

The top edges and the corner posts may comprise recesses having their opening oriented upwards and the locking frame may comprise complementary downwardly oriented protrusions for locking with the recesses, and the method may comprise:

locking the locking frame to the sides and the corner posts via the recesses and the protrusions.

It is further described a method of assembling a storage container as defined above on a site of an ASRS, wherein the method comprises the steps of:

folding each of the sides fully so that each extend at 90 degrees from the base;

sliding each of the corner posts from above into locking engagement with edges of a pair of adjacent sides;

snap locking the corner posts to a flange portion of the storage container such as to bring the corner posts into the locking engagement with the edges of the adjacent sides.

The snap locking of the corner posts may be accomplished using a snap lock which clicks the corner posts to the flange portion of the storage container.

Although the invention has been described in relation to storage containers in ASRS, it is also applicable for/in similar systems used for vertical farming, micro-fulfilment or grocery as well.

The relative terms "upper", "lower", "below", "above", "higher", "inner", "outer" etc. shall be understood in their normal sense and as seen in a cartesian coordinate system.

BRIEF DESCRIPTION OF THE DRAWINGS

Following drawings are appended to facilitate the understanding of the invention. The drawings show embodiments of the invention, which will now be described by way of example only, where:

FIG. 5A is a side perspective view of the corner post, FIG. 5B is a top view of the corner post, and FIG. 5C is a side view of the corner post;

FIG. 7A shows a stack of assembled storage containers according to the first embodiment;

FIG. 7B is a detailed view of section G in FIG. 7B showing details of the relative positions of through-going holes in an upper storage container relative an outer portion of a flange portion of a lower storage container;

FIG. 7C is a simplified view of FIG. 7B showing the relatively upper storage container illustrating a centerline of a through-going hole in the upper storage container;

FIG. 7D is a simplified view of FIG. 7B where some details of the upper and lower storage containers have been omitted in order to better illustrate a principle of how water will flow from the relatively upper storage container to the relatively lower storage container;

DETAILED DESCRIPTION OF THE INVENTION

Figure 1:
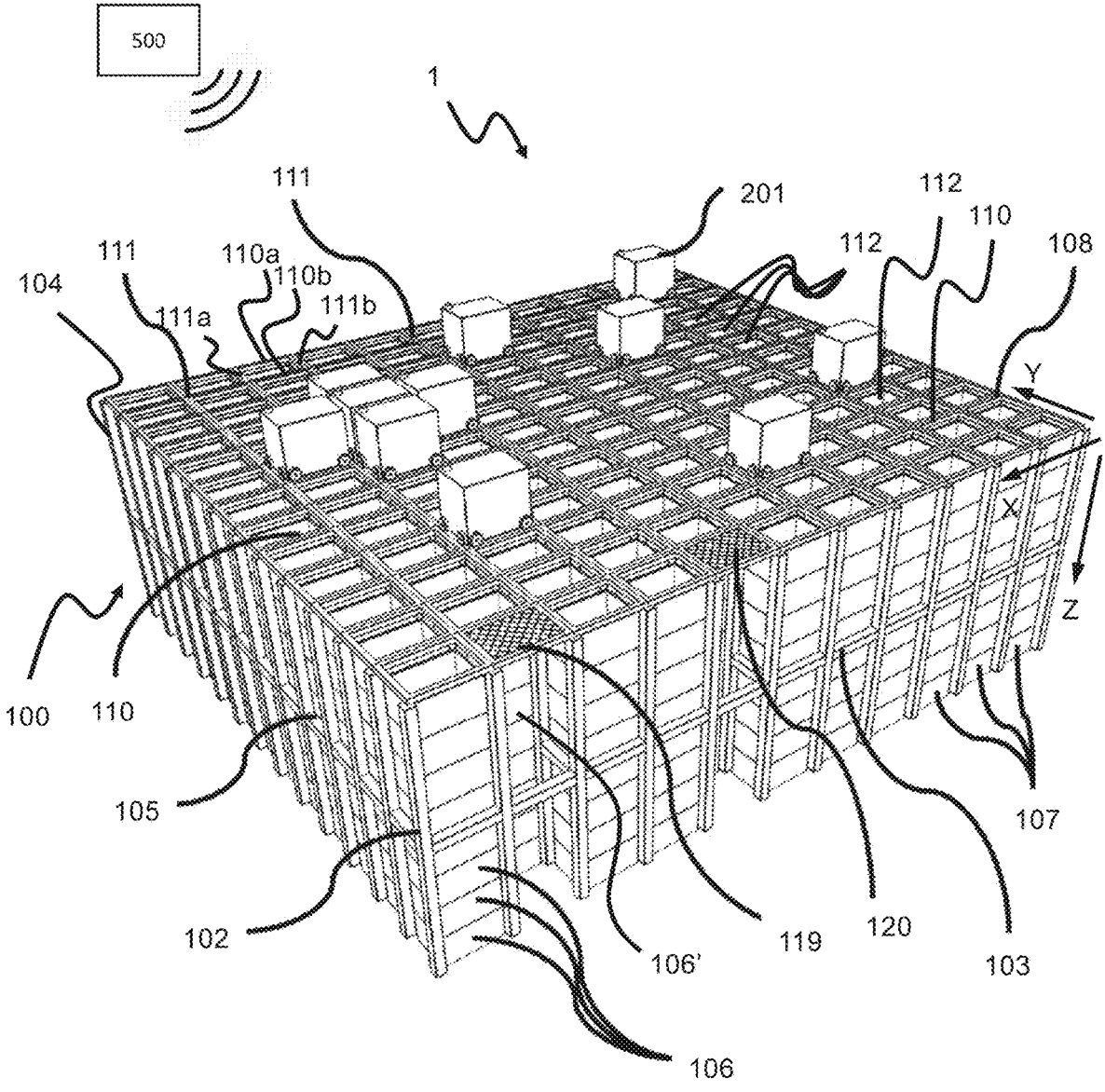
FIG. 1 is a perspective view of a framework structure of a prior art automated storage and retrieval system.

In the following, embodiments of the invention will be discussed in more detail with reference to the appended drawings. It should be understood, however, that the drawings are not intended to limit the invention to the subject-matter depicted in the drawings.

The framework structure 100 of the automated storage and retrieval system 1 is constructed in accordance with the prior art framework structure 100 described above in connection with FIGS. 1-3, i.e. a number of upright members 102 and a number of horizontal members 103, which are supported by the upright members 102, and further that the framework structure 100 comprises a first, upper rail system 108 in the X direction and Y direction.

The framework structure 100 further comprises storage compartments in the form of storage columns 105 provided between the members 102, 103, where storage containers 106 are stackable in stacks 107 within the storage columns 105.

The framework structure 100 can be of any size. In particular it is understood that the framework structure can be considerably wider and/or longer and/or deeper than disclosed in FIG. 1. For example, the framework structure 100 may have a horizontal extent of more than 700×700 columns and a storage depth of more than twelve containers.

First Embodiment of Storage Container

One first embodiment of the automated storage and retrieval system according to the invention will now be discussed in more detail with reference to FIGS. 4-10.

Figure 2:
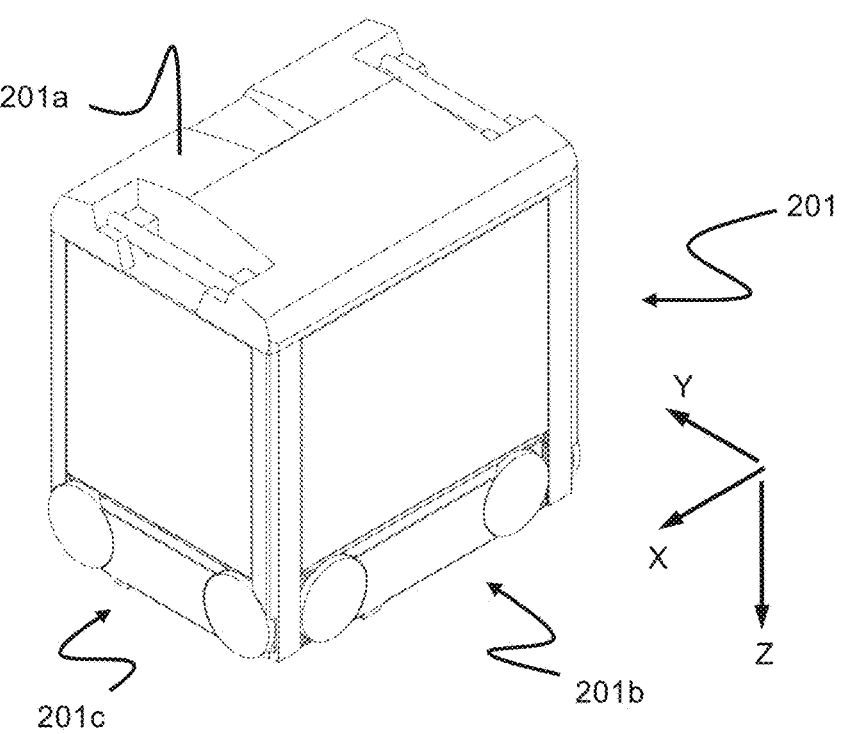
FIG. 2 is a perspective view of a prior art container handling vehicle having a centrally arranged cavity for carrying storage containers therein.
Figure 3:
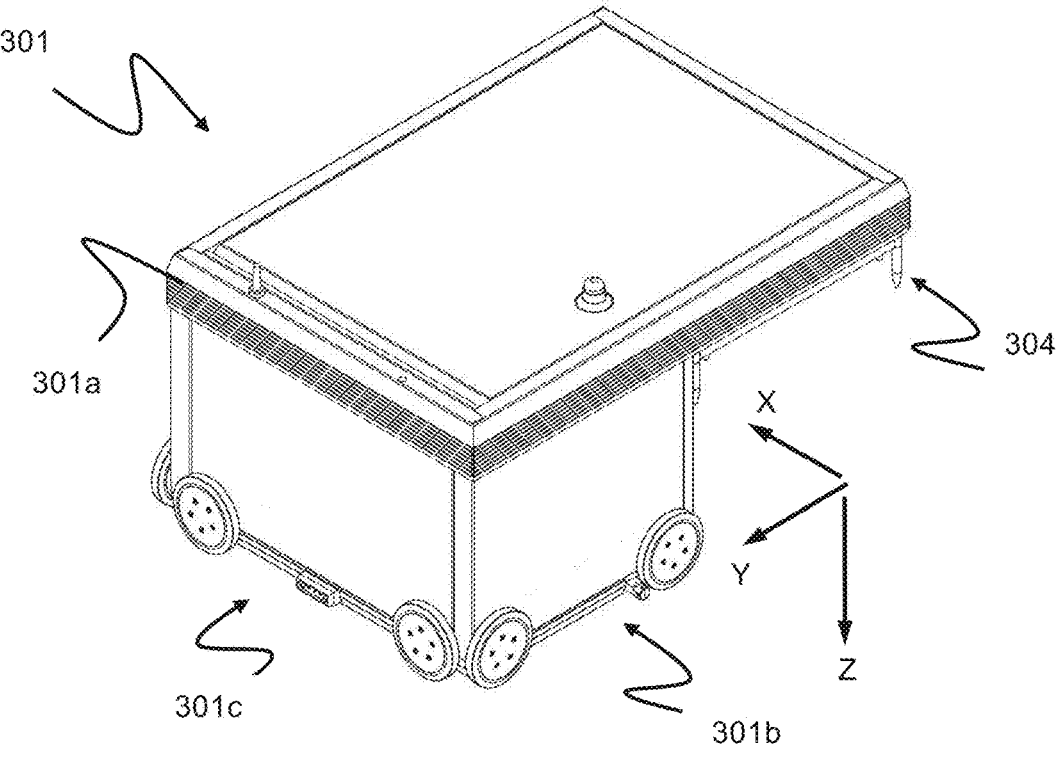
FIG. 3 is a perspective view of a prior art container handling vehicle having a cantilever for carrying storage containers underneath.
Figures 4A, 4B, 4C:
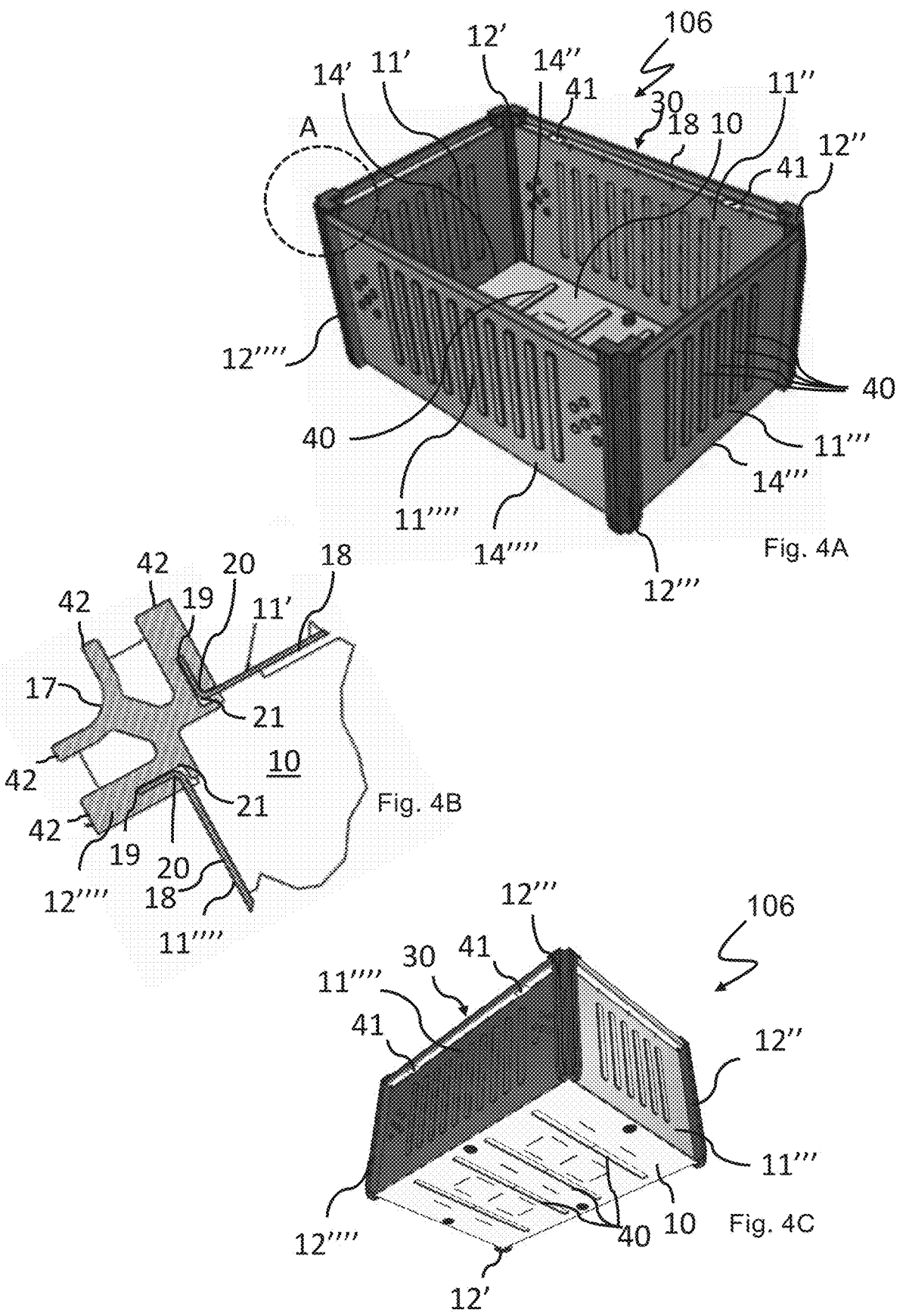
FIG. 4A is a perspective top view of a storage container according to a first embodiment of the invention.
FIG. 4B is an enlarged top view of section A in FIG. 4A.
FIG. 4C is a perspective view from below of FIG. 4A.

FIG. 4A is a perspective top view of a storage container 108 according to a first embodiment of the invention. The storage container 106 is configured to be used in an automated storage and retrieval system (ASRS) 1 (see FIG. 1) as described in relation to FIG. 1 and to be lifted by a container handling vehicle 201, 301 as described in relation to FIGS. 2 and 3, though other forms of container handling vehicle 201, 301 may also be used. The storage container 106 is further configured to be stacked in a stack 107 (see FIG. 1) of storage containers 106 where an underlying storage container 106 supports the storage container(s) 106 positioned above. The storage container 106 is further being adapted to be lifted by grippers 304 (see. FIG. 3) on a lifting device via lifting holes 41 such that the storage container 106 can be lifted from above. The storage container 106 is disclosed with a rectangular base 10 and four sides 11', 11", 11''', 11''''. Each of the sides 11', 11", 11''', 11'''' being hingedly connected to a respective edge 14', 14", 14''', 14'''' of the base 10. It is further disclosed four corner posts 12', 12", 12''', 12''''. Each of the corner posts 12', 12", 12''', 12'''' is configured to interconnect a pair of adjacent sides 11', 11", 11''', 11'''' to each other in a horizontal direction when the sides 11', 11", 11''', 11'''' are positioned substantially 90 degrees relative the base 10 and relative each other (i.e. as shown in FIG. 4A). First short side 11' (i.e. "first side") is connected to first long side 11" (i.e. "second side") via first corner post 12'. First long side 11" (i.e. "second side" is further connected to second short side 11''' (i.e. "third side") via second corner post 12". Second short side 11''' (i.e. "third side" is connected to second long side 11'''' (i.e. "fourth side") via third corner post 12'''. Second long side 11'''' (i.e. "fourth side") is connected to the first short side 11' (i.e. "first side") via fourth corner post 12''''.

FIG. 4B is an enlarged top view of section A of the storage container 106 in FIG. 4A. Section A is a detailed view of the intersection between the third side 11''' and the fourth side 11''''. Both of the disclosed first side 11' and the fourth side 11'''' comprises a top edge 18 and two opposed side edges (only one of the side edges for each side is disclosed). The first and fourth sides 11', 11'' have been folded forming a fold 20 at the side edges to provide an outwardly extending rib 19 at each side edge. The corner post 12'''' is disclosed with a pair of grooves 21 extending in a longitudinal direction thereof each for receiving one of the respective outwardly extending ribs 19 from the first and fourth sides 11', 11''''.

A locking frame 70 is connected to a top edge 18 of the sides 11'-11''''. The sides 11'-11'''' and the base 10 are disclosed with indentations 40 in to order to increase strength. The sides 11'-11'''' are disclosed with indentations extending in the vertical direction (when the sides 11'-11'''' are folded upwards). The indentations are profiled, i.e. not through-going holes). Similarly, the base 10 is disclosed with indentations extending from the second side 11'' towards the fourth side 11'''' (i.e. extending between the first and second long sides 11'', 11'''' of the base 10.

As can be seen in FIG. 4B, the fourth corner post 12'''' is disclosed with a longitudinal indent 17 on an exterior surface. The longitudinal, or vertical, indent 17 assists in enabling that the storage container 106 is able to be lifted by grippers 304 (see FIG. 3) on a lifting device in that bin guides (not shown) of the lifting device can be guided along the indents 17 on the different corner posts 12', 12", 12''', 12''''.

The corner post 12'''' is further disclosed with outer surface 42 for sliding contact with the upright members 102 of the framework structure 100 (see FIG. 1). If the upright members 102 are formed of aluminium, at least the outer surface 42 of the corner posts 12', 12", 12''', 12'''' guided by the upright members 102 shall be coated or formed of another material than aluminium in order to avoid scratching and noise resulting from aluminium sliding against aluminium during lifting and lowering of the storage containers 106 within the framework structure 100.

FIG. 4C is a perspective view from below of FIG. 4A illustration, showing inter alia more details of the indentations in the base 10. In addition, the lifting holes 41 are seen from below.

Figures 4D, 4E, 4F:
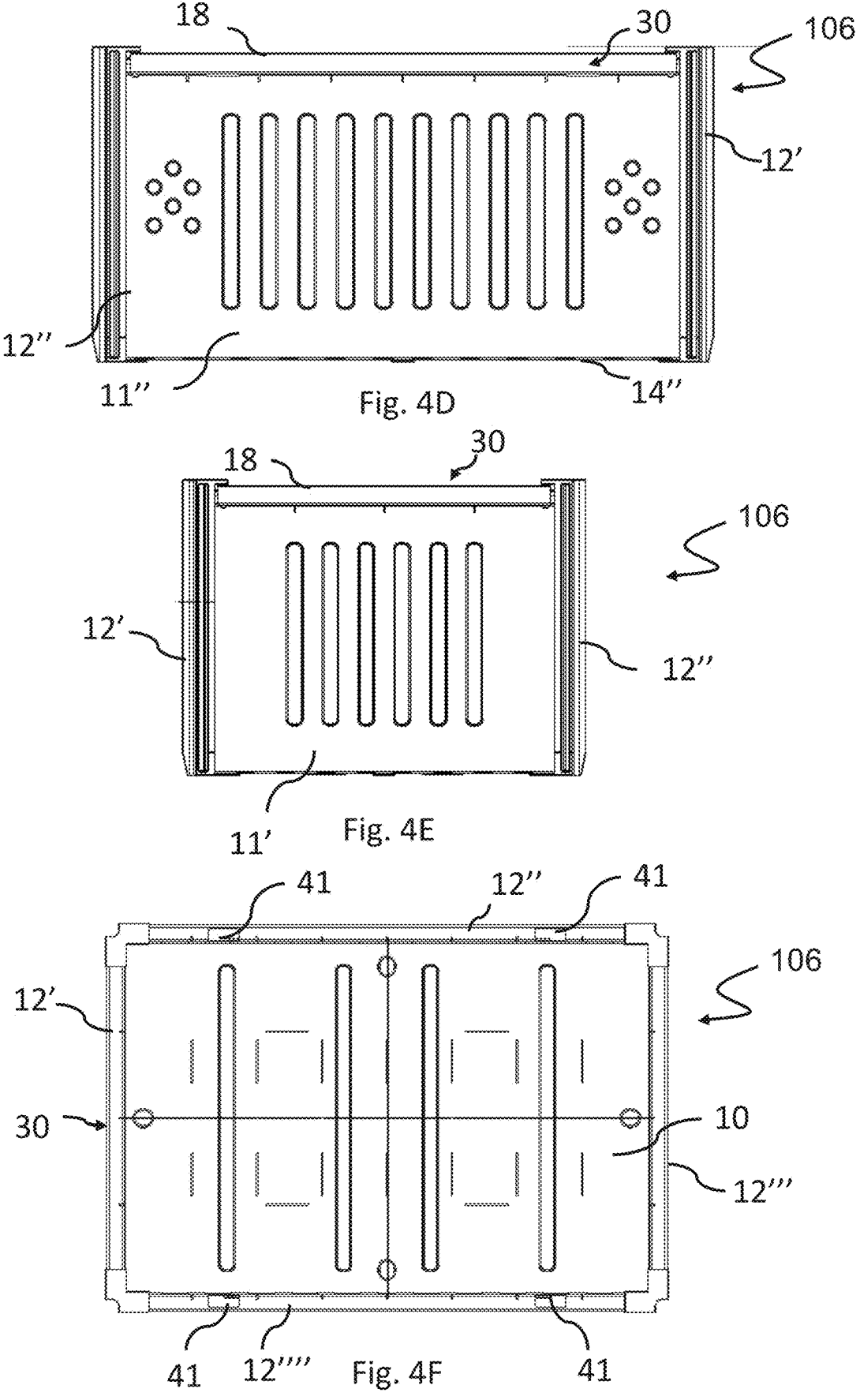
FIG. 4D is a side view of the relatively longer side (i.e. the X-direction) of the storage container according to the first embodiment.
FIG. 4E is a side view of the relatively shorter side (i.e. the Y-direction) of the storage container according to the first embodiment.
FIG. 4F is a top view of the storage container according to the first embodiment.

FIG. 4D is a side view of a relatively longer side, i.e. the second side 11'', (extending in X-direction) of the storage container 106 according to the first embodiment. As is seen from FIG. 4D, an upper end of the first and second corner posts 12', 12'' is at a level above a top edge 18 of the second side 11''. Furthermore, as shown, a lower end of the first and second corner posts 12', 12'' are at a level above a lower end of the second side 11''. This setup ensures that an upper end of the corner posts 12'-12'''' is in contact with an underside of corner post of a storage container above, which again ensures that all or a majority of the vertical load of the above storage container is supported by the corner posts 12'-12''''.

FIG. 4E is a side view of the relatively shorter side (i.e. the Y-direction) of the storage container according to the first embodiment indicating the relative height of a short side, i.e. the first side 11', compared to the height of the first and second corner posts 12', 12''.

FIG. 4F is a top view of the storage container 106 according to the first embodiment.

Figure 4G:
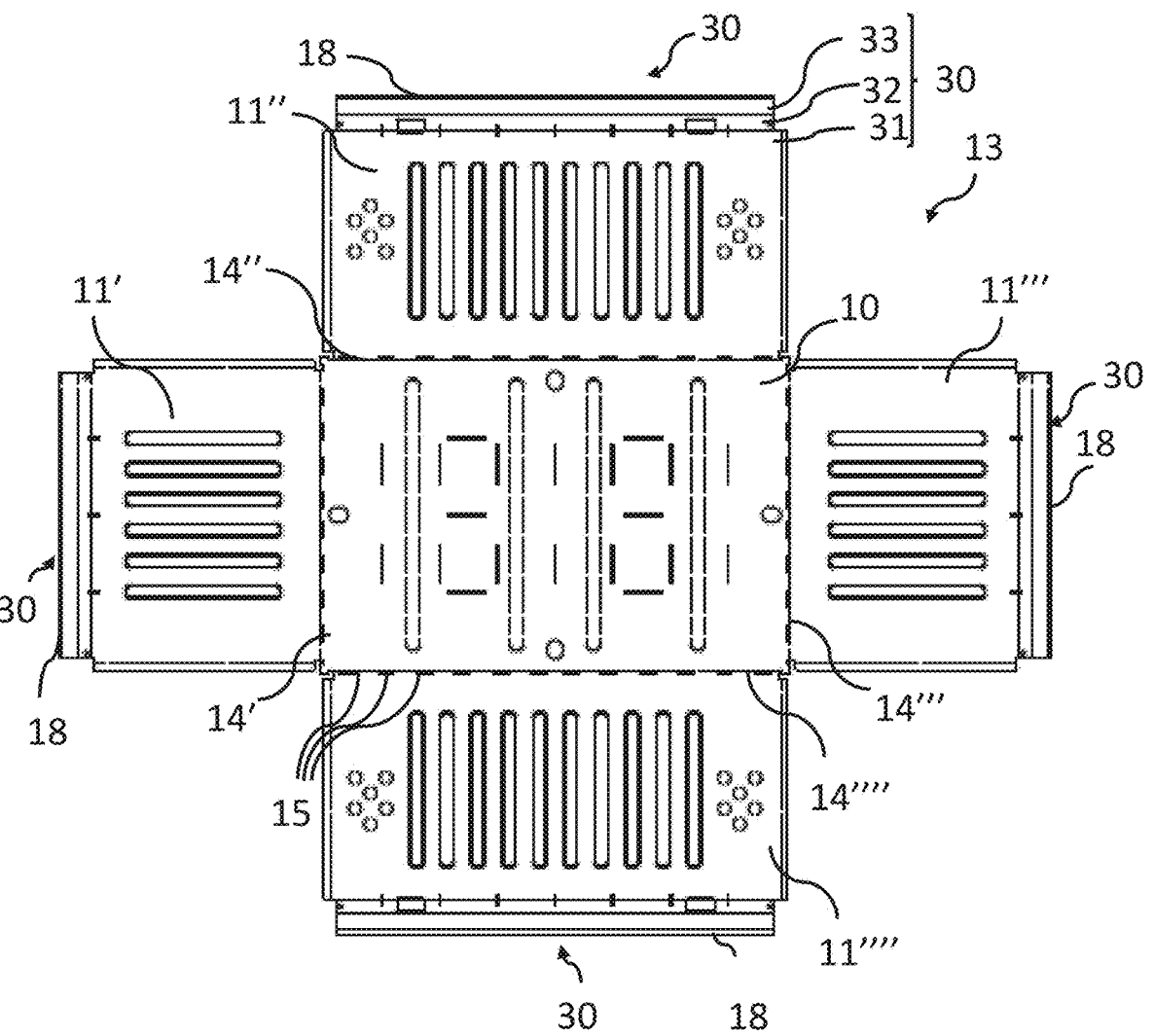
FIG. 4G is a top view of a sheet material forming a base and four sides of the storage container according to the first embodiment.

FIG. 4G is a top view of a sheet material 13 forming a base 10 with a rectangular shape and four sides 11', 11", 11''', 11'''' of the storage container 106 according to the first embodiment. The sheet material 13 may have been provided as a blank from which the base 10 and four sides 11', 11", 11"', 11"" have been formed. Each of the sides 11', 11", 11"', 11"" are connected to a respective edge 14', 14", 14"', 14"" of the base 10 by a live hinge provided by a line of weakness 14', 14", 14"', 14"". The lines of weakness 14', 14", 14"', 14"" extend between each of the sides 11', 11", 11"', 11"" and the base 10 such that the respective sides 11', 11", 11"', 11"" can be folded relative the base 10 along the line of weakness 14', 14", 14"', 14"". In particular, a first line of weakness 14' extends between a first edge of the base 10 and the first side 11', a second line of weakness 14" extends between a second edge of the base 10 and the second side 11", a third line of weakness 14"' extends between a third edge of the base 10 and the third side 11"', and a fourth line of weakness 14"" extends between a fourth edge of the base 10 and the first side 11"". As such, the base and the sides can be made from the same material.

The lines of weakness 14', 14", 14"', 14"" can be lines where an amount of the material of the sheet material 13 has been reduced. Alternatively, or in addition, the lines of weakness 14', 14", 14"', 14"" may comprise through-going holes 15. As shown in FIG. 4G, the through-going holes 15 may make up a significant amount of the lines of weakness, for example as illustrated, the through-going holes may make up more than 30% of the lines of weakness 14', 14", 14"', 14'.

As illustrated, in order to simplify folding of the sides 11', 11", 11"', 11"", the lines of weakness 14', 14", 14"', 14"" can be rectilinear lines.

As shown in FIG. 4G, the sheet material 13 may be stamped to provide an outline of the base 10 and the four sides 11', 11", 11"', 11"". The stamping process may also form other features, like the lines of weakness 14', 14", 14"', 14' and/or the through-going holes 15, during the step of providing an outline.

The base 10 and sides 11', 11", 11"', 11"" may be formed from a metal sheet material 13, a plastic sheet material 13, a cardboard sheet material 13, a composite sheet material 13 etc. If made of a metal sheet material 13, it may be for example be made of an aluminium sheet material 13 or a steel sheet material 13.

Figures 4H, 4I:
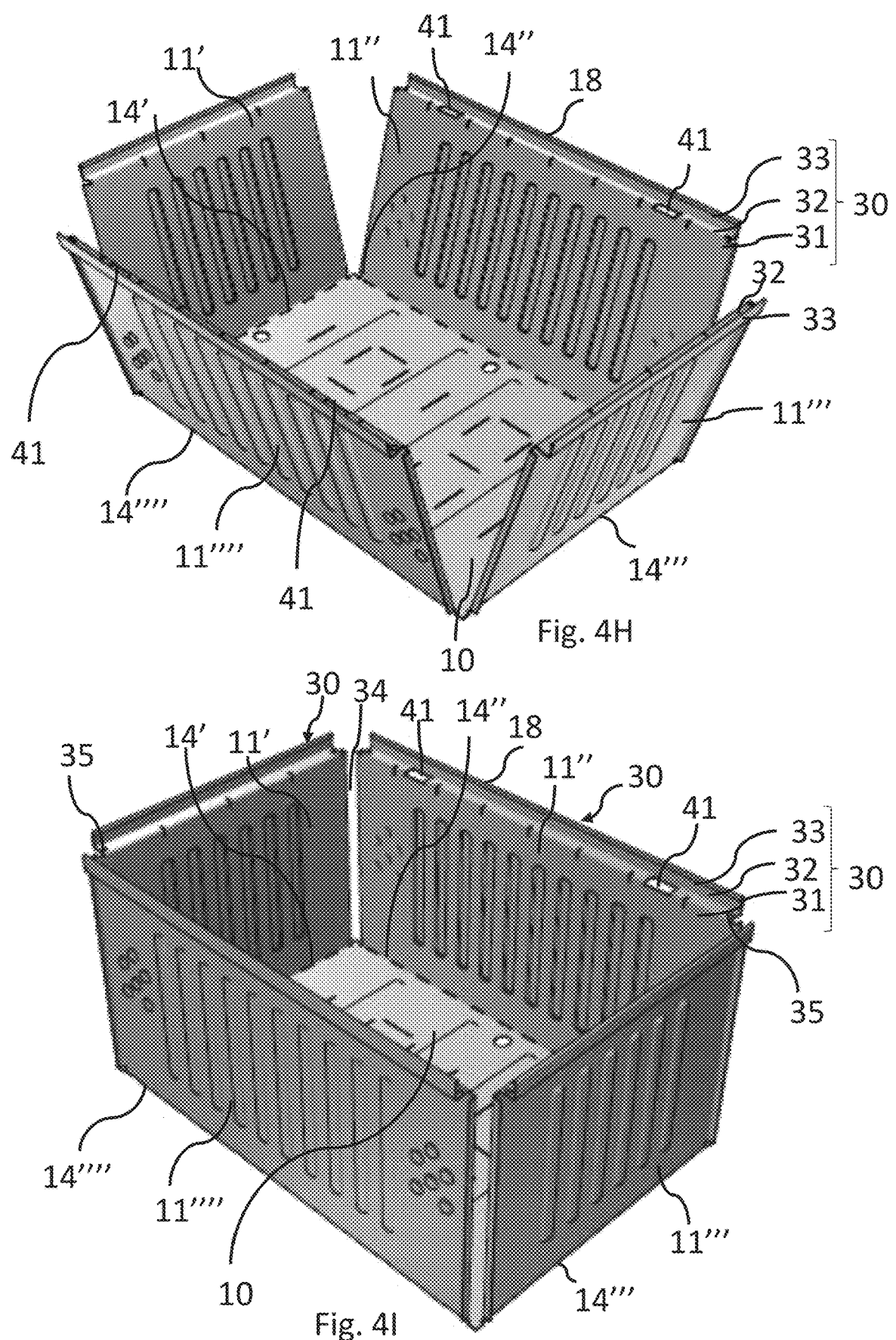
FIG. 4H is a side perspective view of the sheet material in FIG. 4G where the sides have been folded approximately 75 degrees upwards relative to the base to facilitate stacking of sheet materials during transport.
FIG. 4I is a side perspective view of the sheet material in FIGS. 4G and 4H where the sides have been folded substantially 90 degrees upwards relative to the base.

FIG. 4H is a side perspective view of the sheet material in FIG. 4G where the sides 11', 11", 11"', 11"" have been folded approximately 75 degrees upwards relative the base 10 to facilitate stacking of sheet materials 13 during transport.

FIG. 4I is a side perspective view of the sheet material 13 in FIGS. 4G and 4H where the sides 11', 11", 11"', 11"" have been folded substantially 90 degrees upwards relative the base 10. In this position, two adjacent sides 11'-11"" form a 90 degree angle between them. Further, as seen in FIG. 4I, the distance between the side edges of one side 11'-11"" is shorter than a distance between two edges 14'-14"" of the base 10 such that the adjoining side edges of the adjacent sides 11', 11", 11"', 11"" finish short of true geometrical corners of an interior of the storage container 106, forming an opening 34 therebetween.

Now referring to FIGS. 4G, 4H, 4I, the top edge 18 of the storage container forms part of a flange portion 30 of the sides 11', 11", 11"', 11"". The flange portion 30 comprises a main portion 31, an intermediate portion 32 and an outer portion 33. The top edge 18 forms the upper end of the outer portion 33. The intermediate portion 32 has been folded outwardly relative the main portion 31 and the outer portion 33 has been folded upwardly relative the intermediate portion 32. The intermediate portion 32 thus forms a step or ledge between the main portion 31 and the outer portion 33.

This configuration strengthens the sides 11'-11"" as they are stiffened by the flange portion 30. As such, the risk of buckling of the storage container 106 is reduced. In order to make the storage containers 106 stackable and to maximize the storage volume, the main portion 31 and the outer portion 33 are shown as being parallel.

Figures 5A, 5B, 5C:
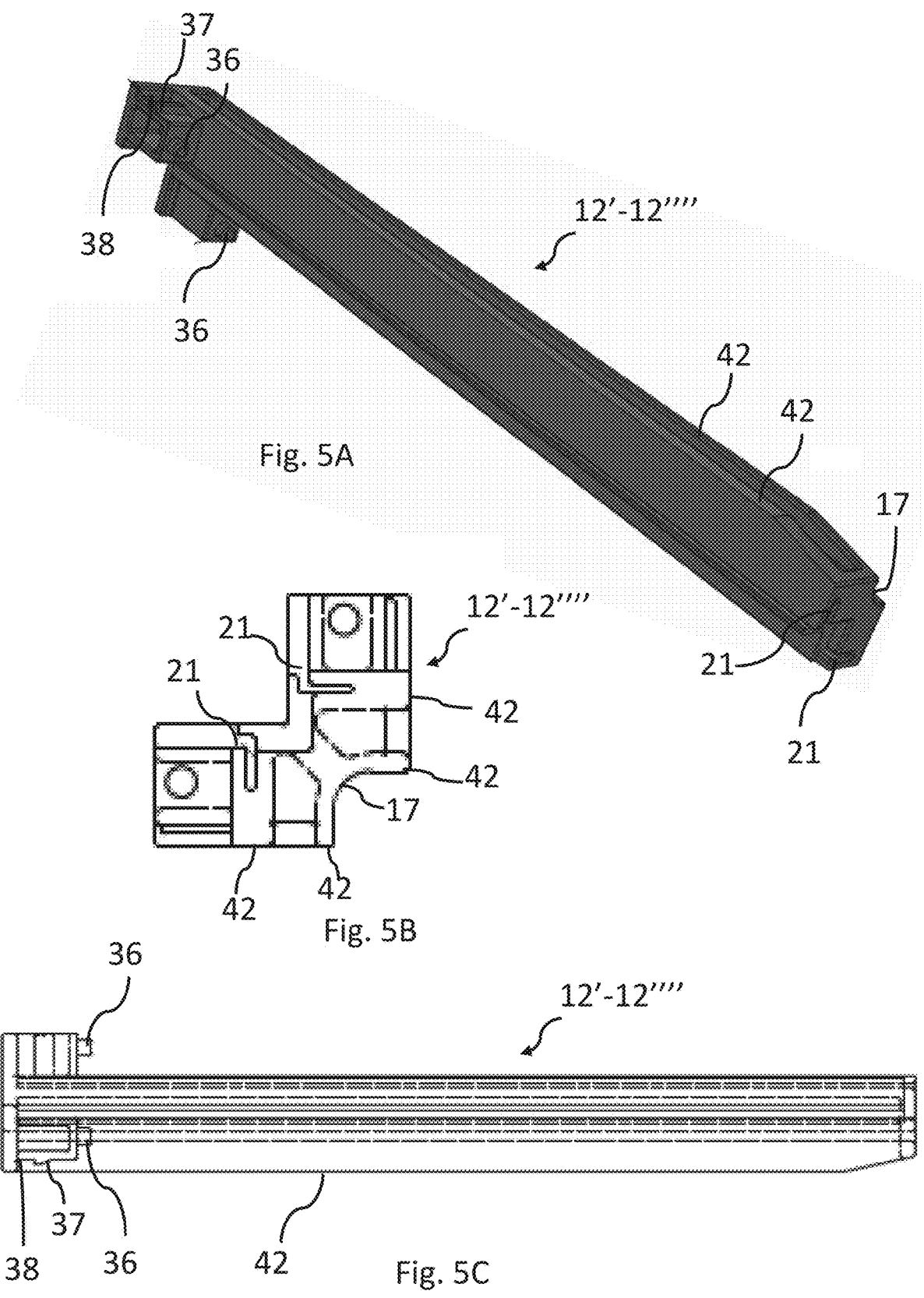
FIGS. 5A, 5B and 5C are detailed views of a corner post of the first embodiment of the storage container, where

As shown in FIG. 4I, the intermediate portion 32 of the flange portion 30 may comprise locking holes 35 for locking against a pin member 36 on the corner post 14' (see FIGS. 5A-5C).

FIGS. 5A, 5B and 5C are detailed views of a corner post 12'-12' of the first embodiment of the storage container, where FIG. 5A is a side perspective view of the corner post 12'-12"", FIG. 5B is a top view of the corner post 12'-12"", and FIG. 5C is a side view of the corner post 12'-12"".

The corner post 12'-12"" comprises a first and second pin member 36 for locking against locking holes 35 in the intermediate portion 32 of the flange portion 30 of the respective sides 11'-11"". The corner post 12'-12"" is further provided a snap lock connection 37 for locking the corner post 12', 12", 12"', 12' to the flange portion 30. The snap lock connection 37 comes into contact with an inner surface of the side 11'-11"" and is forced into connection to the side 11'-11"" when the outer portion 33 of the flange portion 30 enters a recess 38 provided on an underside of an upper portion of the corner post 12'-12"".

Figure 6:
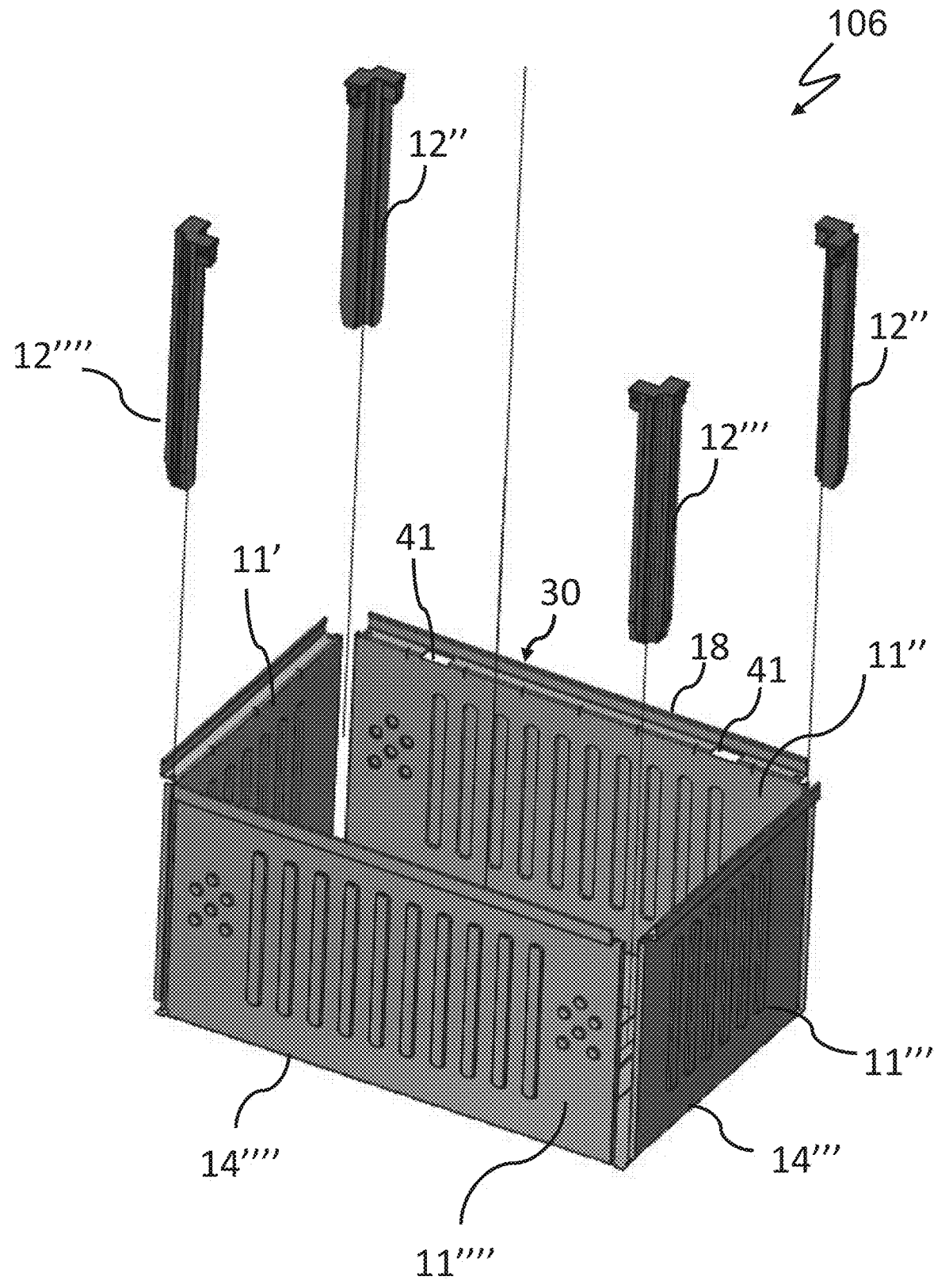
FIG. 6 is an exploded view of the corner posts and the sides of the storage container according to the first embodiment.

FIG. 6 is an exploded view of the corner posts 12'-12"" and the sides 11'-11"" of the storage container 106 according to the first embodiment.

FIG. 7A shows a stack 107 of storage containers 106 according to the first embodiment.

FIG. 7B is a detailed view of section G in FIG. 7B showing details of the relative positions of through-going holes 15 in an upper storage container 106 relative an outer portion 33 of a flange portion 30 of a lower storage container 106. A cross sectional area of the through-going holes 15 is of a sufficient size for water to flow therethrough. FIG. 7C is a simplified view of FIG. 7B showing the relatively upper storage container 106 illustrating a centerline 16 of a through-going hole 15 in the upper storage container 106. A cross sectional area formed by the outer portions of the sides 11', 11", 11"', 11"' are larger in all directions than the base 10.

Consequently, the through-going holes 15 of the base 10 of a storage container 106 supported directly above is inside the outer portion 33, such that any water flowing through the through-going holes 15 of the storage container 106 above is guided into the storage container 106 via the outer portion 33, the intermediate portion 32 and the main portion 31 of the flange portion 30.

As seen in FIGS. 7B and 7C, the through-going holes 15 are disclosed with an inlet 43 arranged on an inner surface of the storage container 106 and an outlet 44 arranged on an outer surface of the storage container 106. As disclosed, the inlet 43 is arranged at a higher elevation than the outlet 44 of the through-going holes 15. Further referring to FIGS. 7B and 7C, the centerline 16 of the through-going hole 15 form a negative angle $\alpha$ relative a horizontal plane P. The horizontal plane P is shown as parallel to the base 10 of the storage container 106.

FIG. 7D is a simplified view of FIG. 7B where some details of the upper and lower storage containers 106 have been omitted in order to better illustrate a principle of how water W will flow from the relatively upper storage container 106 to the relatively lower storage container 106 through the through-going holes before it is guided into the relatively lower storage container 106 via the outer portion 33, the intermediate portion 32 and the main portion 31 of the flange portion 30. The intermediate portion 32 thus forms a step or ledge between the main portion 31 and the outer portion 33. In other words, the outer portion 33 of the flange portion 30 at the top of the sides 11'-11"" projects out to guide water coming out of the through-going holes 15 used to form the lines of weakness of the storage container 106 above. I.e. the through-going holes 15 both have a function in forming the lines of weakness 14'-14"" and in guiding water down through an underlying storage container 106 in the event of fire.

As such, the outer portions 33 of the sides may be arranged beyond, in all horizontal directions, any through-going holes of a storage container supported directly above.

The configuration of the flange portion 30 relative to the through-going holes 15 thus ensures that water from above, be it from a sprinkler system in the building or from a storage container 106 above or other source, is guided into the underlying storage containers 106 providing a better fire-extinguishing.

Figure 7E:
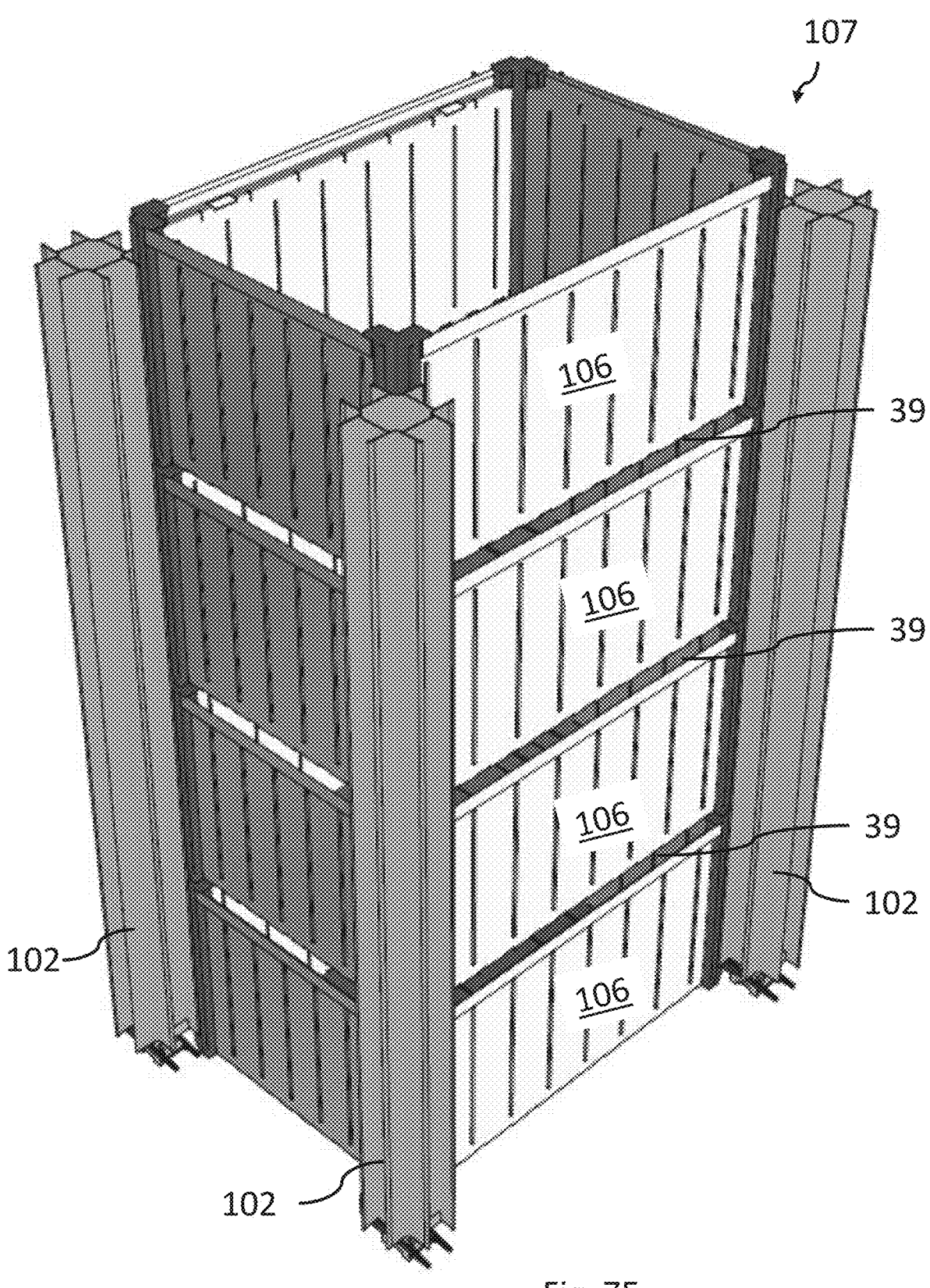
FIG. 7E is a perspective view of a stack of storage containers according to the first embodiment and illustrating that a gap is formed between the sides of two adjacent storage container (i.e. a gap is formed between the sides of two storage containers where one is stacked directly above the other)

FIG. 7E is a perspective view of a stack 107 of storage containers 106 according to the first embodiment and illustrating that a gap 39 is formed between the sides 11'-11"" of two storage containers stacked on top of each other.

Figures 8A, 8B:
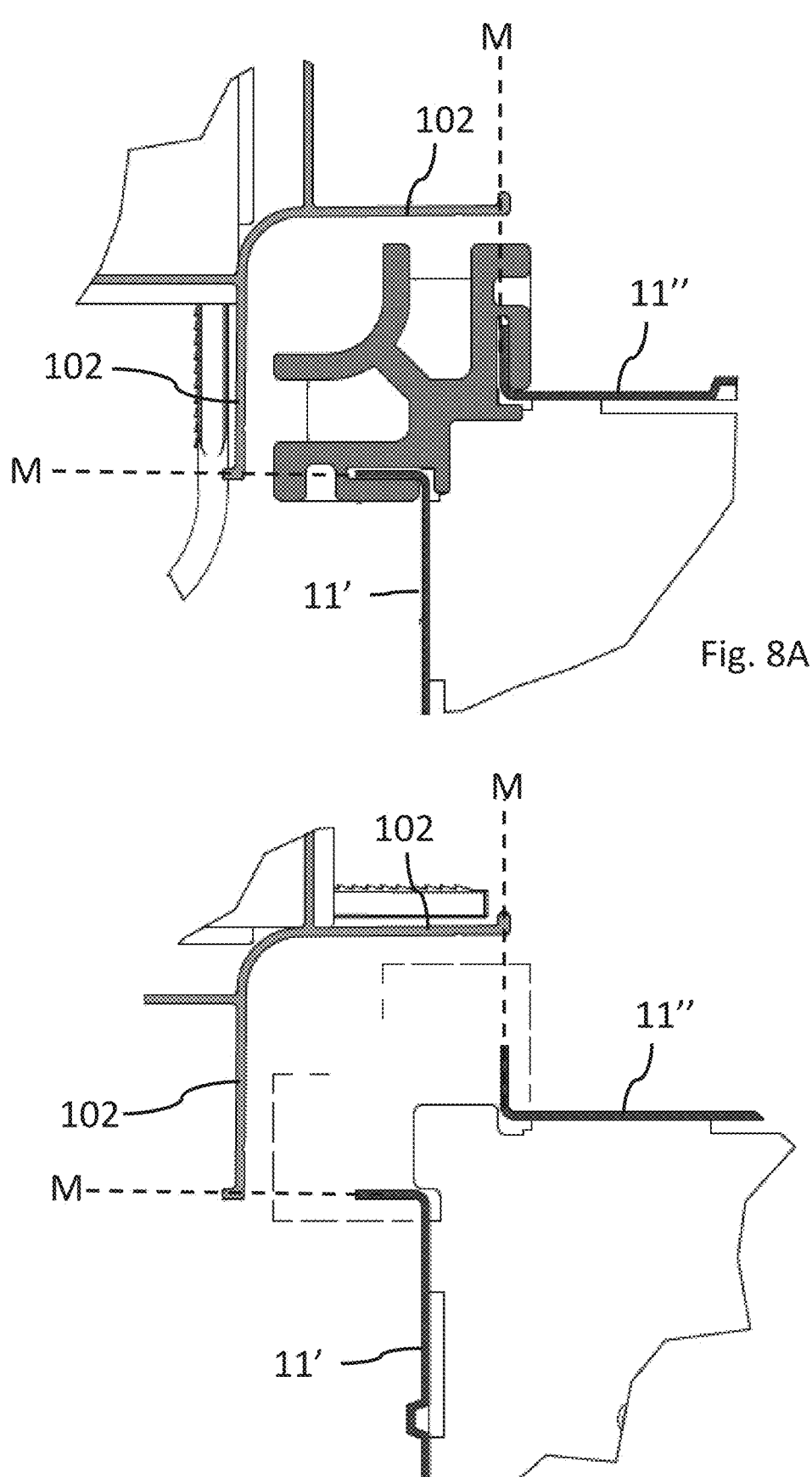
FIG. 8A is a top view indicating the positions of the side edges of the sides relative the upright members of the framework structure.
FIG. 8B is a similar view as FIG. 8A where the corner post has been removed.

FIG. 8A is a top view indicating the positions of the side edges of the sides 11'-11' relative the upright members 102 of the framework structure 100. FIG. 8B is a similar view as FIG. 8A where the corner post 12'-12"" has been removed. The length of the sides 11'-11"" in the X and Y directions are preferably longer than the distance between two upright members 102 in the X and the Y directions. This enables that the position of the side edges of the sides 11'-11"" of the storage container 106 relative the upright members 102 of the framework structure 100 of the ASRS, are such that, in case the corner posts 12'-12"" melts during an event of fire and one or more of the four sides 11'-11"", as a consequence of not being supported by the corner post 12'-12"" anymore, move outwards, the sides 11'-11"" will lean against the upright members 102 as illustrate by lines M. This will retain most of the integrity and stability of the stack 107 of storage containers and prevent the stack 107 from collapsing.

Figures 9A, 9B:
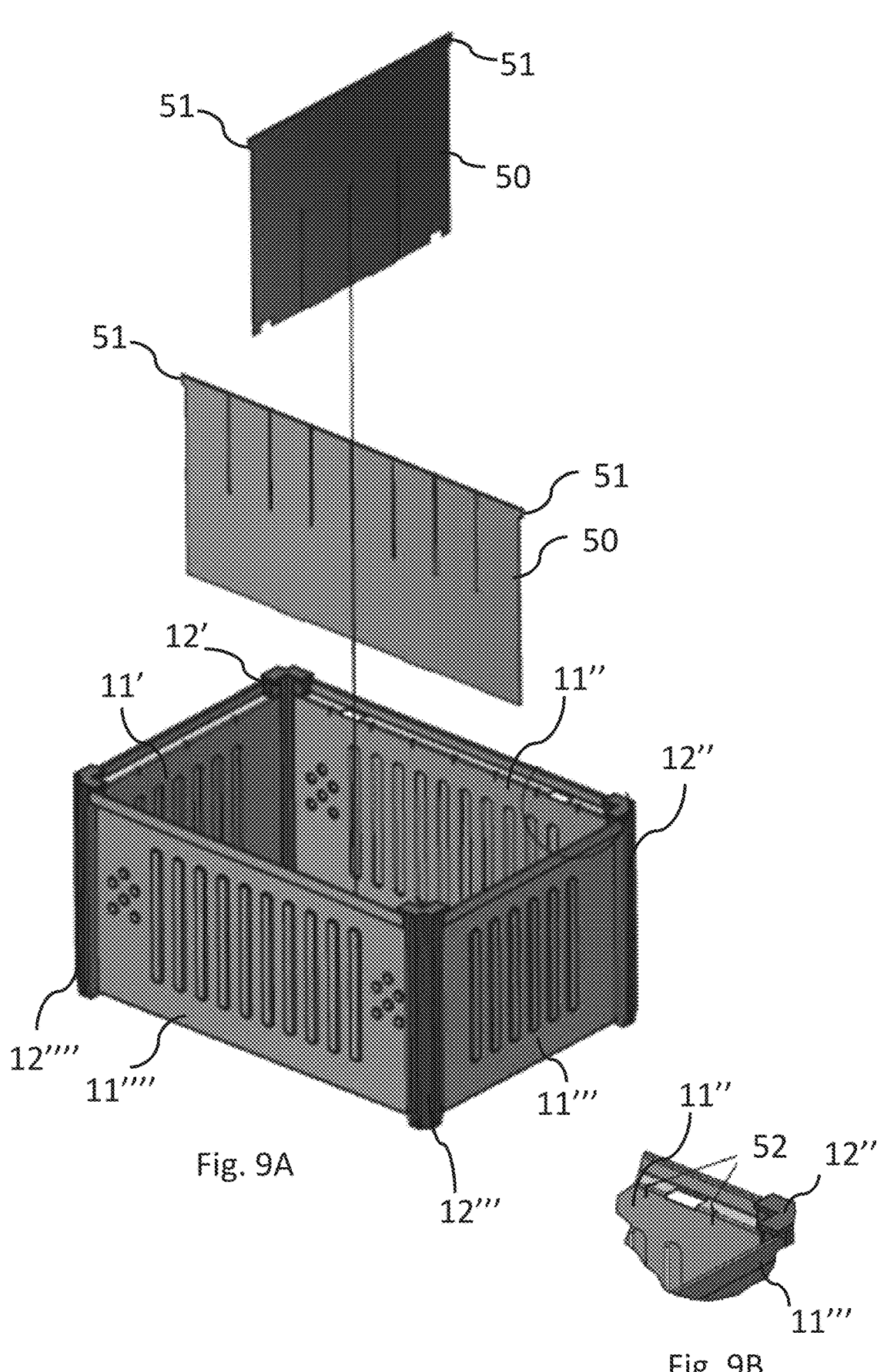
FIG. 9A is an exploded view of the storage container according to the first embodiment further comprising dividers separating an inventory of the storage container into separate sections.
FIG. 9B is a detailed view of section L in FIG. 9A.

FIG. 9A is an exploded view of the storage container 106 according to the first embodiment further comprising dividers 50 separating an inventory of the storage container 106 into separate sections. The dividers 50 are shown with projections 51 on opposite sides thereof.

FIG. 9B is a detailed view of section L in FIG. 9A. As indicated in FIG. 9B, the intermediate portion 32 of the flange portion 30 is disclosed with slots 52 for receiving the projections 51 of the dividers 50.

Figure 10:
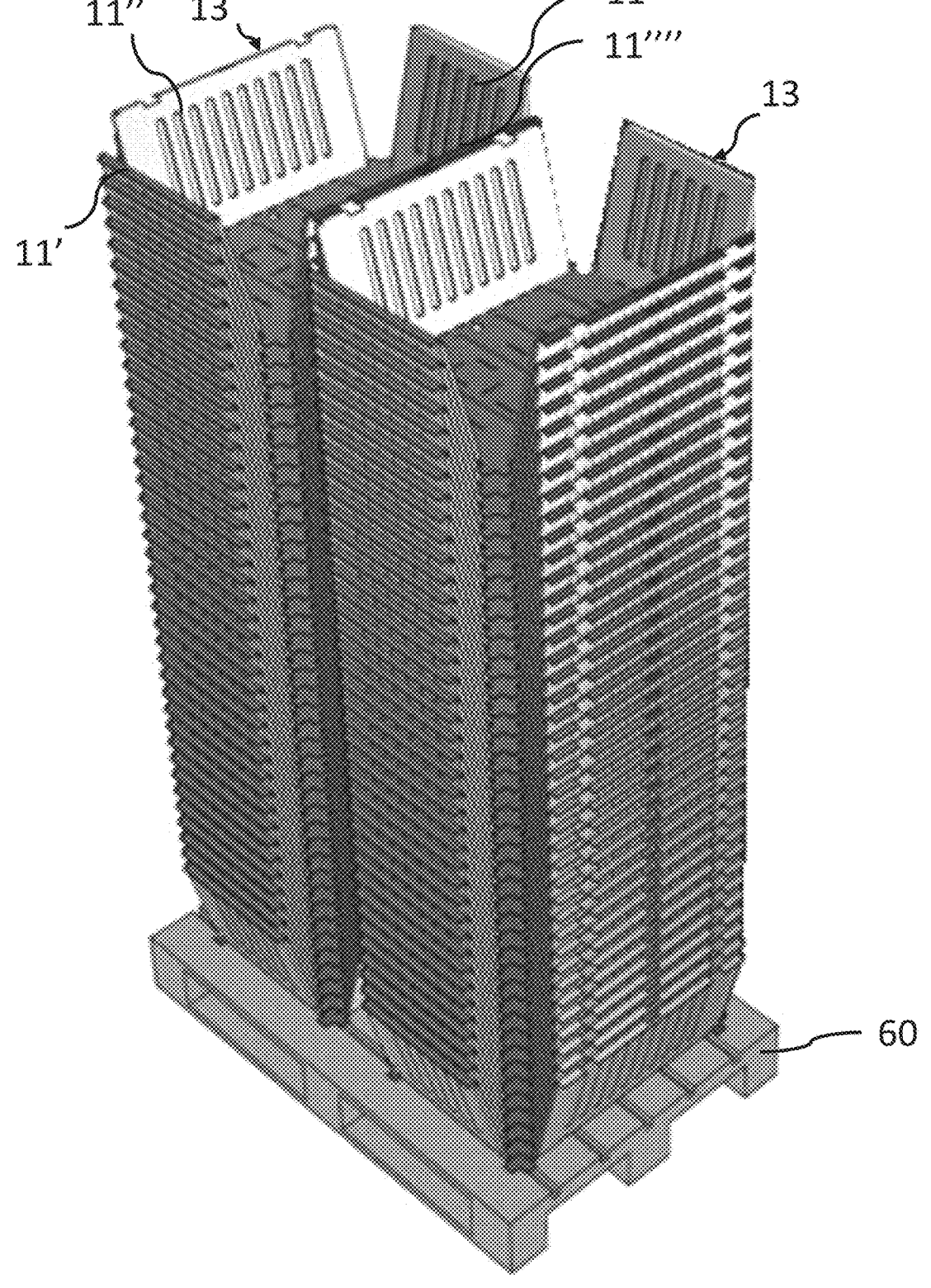
FIG. 10 shows a pallet with two stacks of partially folded sides of sheet material for transport.

FIG. 10 shows a transport platform in the form of a pallet 60 with two stacks of partially folded sides of sheet material 13 for transport positioned thereon. FIG. 10 shows that the two stacks of partially folded sides of sheet material 13 are within a vertical projection of the base of the pallet 60.

The storage containers 106 according to the first embodiment can be mounted on site in the following steps:

partially folding each of the sides 11', 11", 11'", 11"" relative to the base 10 between 20 and 85 degrees;

stacking the partially folded sides 11', 11", 11'", 11" and bases 10 at least partly into or within each other on the pallet 60;

positioning the corner posts 12', 12", 12'", 12"" on a platform (platform with corner posts not shown in FIG. 10);

transporting the stacks of partially folded sides 11', 11", 11'", 11"" and bases 10 and the corner posts 12', 12", 12', 12"" to a site of the ASRS;

assembling the storage containers 106 on site. The step of assembling may comprise:

folding the sides 11', 11", 11'", 11" fully so that each extend at 90 degrees from the base 10;

sliding each of the corner posts 12', 12", 12'", 12"" from above into locking engagement with edges of a pair of adjacent sides 11', 11", 11'", 11""; and snap locking the corner posts 12', 12", 12'", 12"" to the flange portion 30 of the storage container 106 such as to bring the corner posts 12', 12", 12'", 12"" into the locking engagement with the side edges of the adjacent sides 11', 11", 11'", 11"".

Second Embodiment of Storage Container

One first embodiment of the automated storage and retrieval system according to the invention will now be discussed in more detail with reference to FIGS. 11-13.

Many of the features are similar as for the first embodiment described in detail above. The different features and functions will be described in the following. The common features will not be repeated.

Figure 11A:
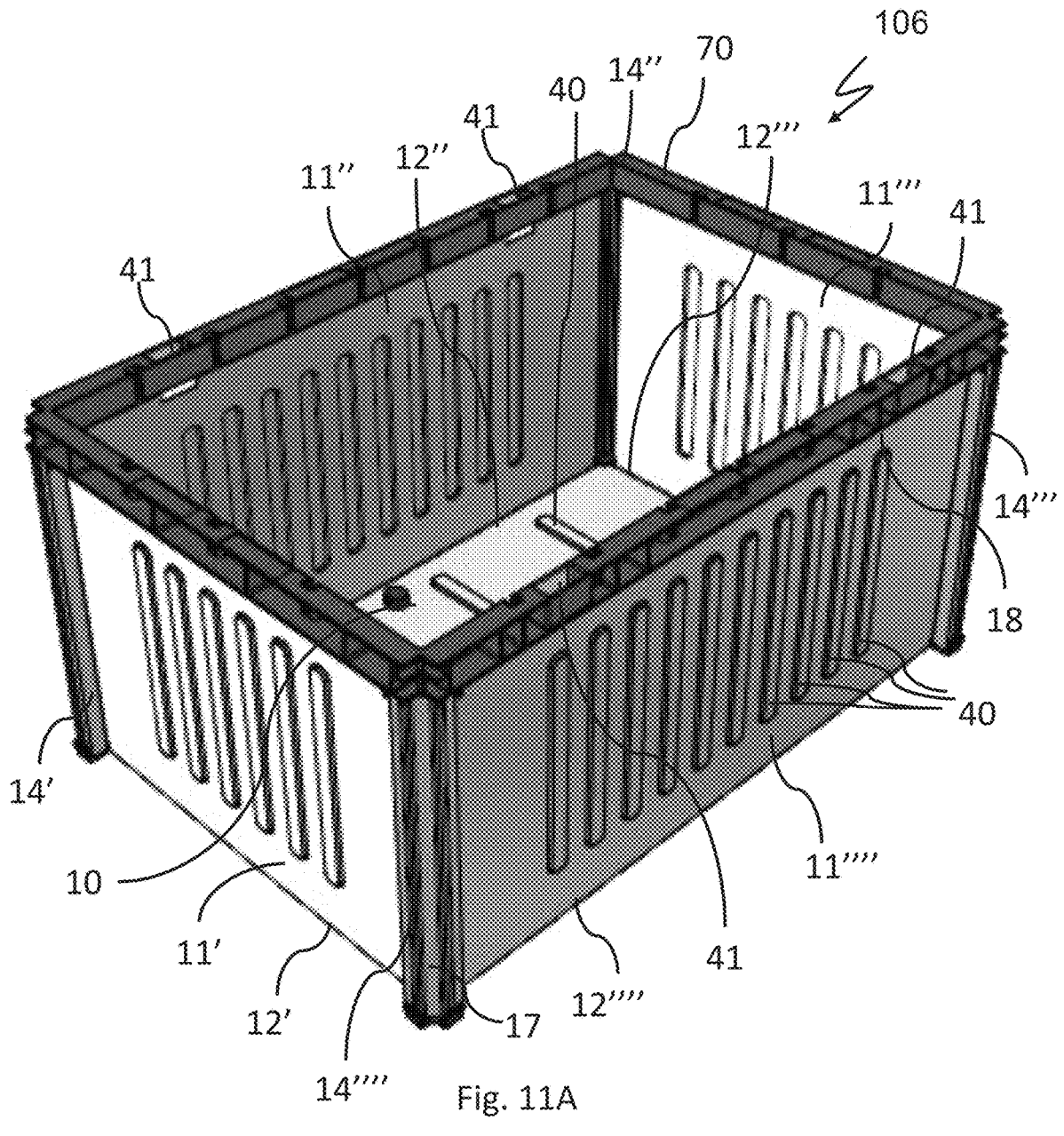
FIG. 11A is a perspective view of a storage container according to the second embodiment.

FIG. 11A is a perspective view of a storage container 106 according to the second embodiment. It is shown a storage container 106 for an automated storage and retrieval system, ASRS, 1. The storage container 106 is configured to be stacked in a stack of storage containers 106 where an underlying storage container 106 supports the storage container(s) 106 positioned above. The storage container 106 comprises lifting holes 41 such that it is adapted to be lifted by grippers 304 (see. FIG. 3) on a lifting device such that the storage container 106 can be lifted from above. The storage container 106 is disclosed with a rectangular base 10, four sides 11', 11", 11'", 11"", each hingedly connected to an edge 14', 14", 14'", 14"" of the base 10, four corner posts 12', 12", 12'", 12", each configured to interconnect a pair of adjacent sides 11', 11", 11'", 11"" to each other in a horizontal direction when the sides 11', 11", 11'", 11"" are positioned substantially 90 degrees relative the base 10 and relative each other. First short side 11' (i.e. "first side") is connected to first long side 11" (i.e. "second side") via first corner post 12'. First long side 11" (i.e. "second side" is further connected to second short side 11'" (i.e. "third side") via second corner post 12". Second short side 11'" (i.e. "third side" is connected to second long side 11"" (i.e. "fourth side") via third corner post 12'". Second long side 11"" (i.e. "fourth side") is connected to the first short side 11' (i.e. "first side") via fourth corner post 12"".

The sides 11'-11"" and the base 10 are disclosed with indentations 40 in to order to increase strength. The sides 11'-11"" are disclosed with indentations extending in the vertical direction (when the sides 11'-11"" are folded upwards). The indentations are profiled, i.e. not through-going holes). Similarly, the base 10 is disclosed with indentations extending from the second side 11" towards the fourth side 11"" (i.e. extending between the first and second long sides 11", 11"" of the base 10).

Figure 11B:
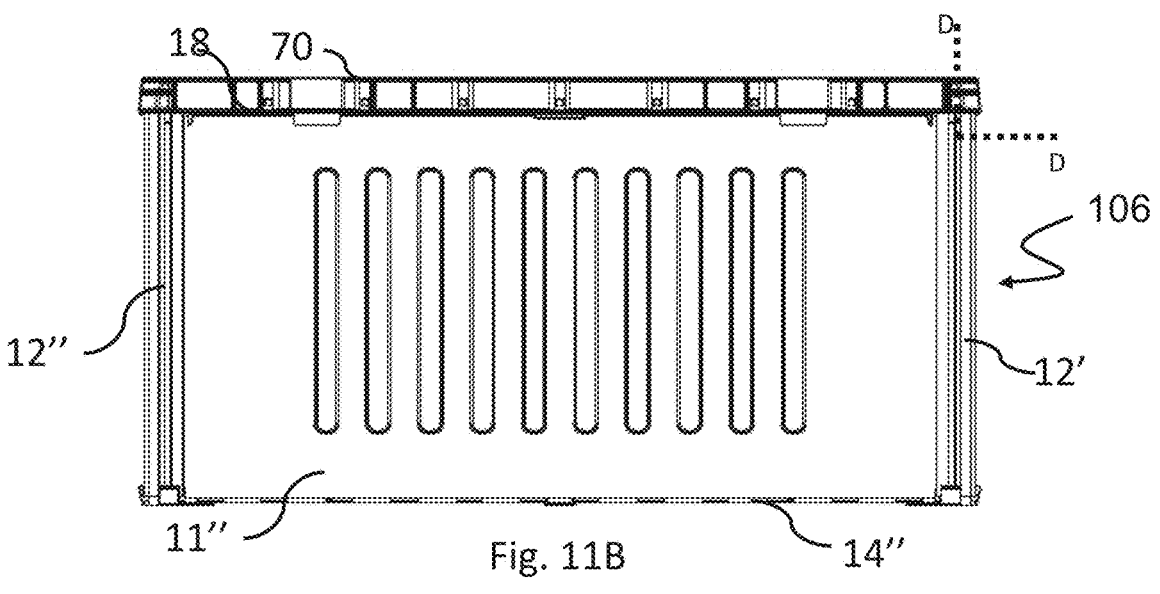
FIG. 11B is a side view of a long side of the storage container according to the second embodiment.

FIG. 11B is a side view of a long side, i.e. the second side 11" of the storage container 106 according to the second embodiment.

Figure 11C:
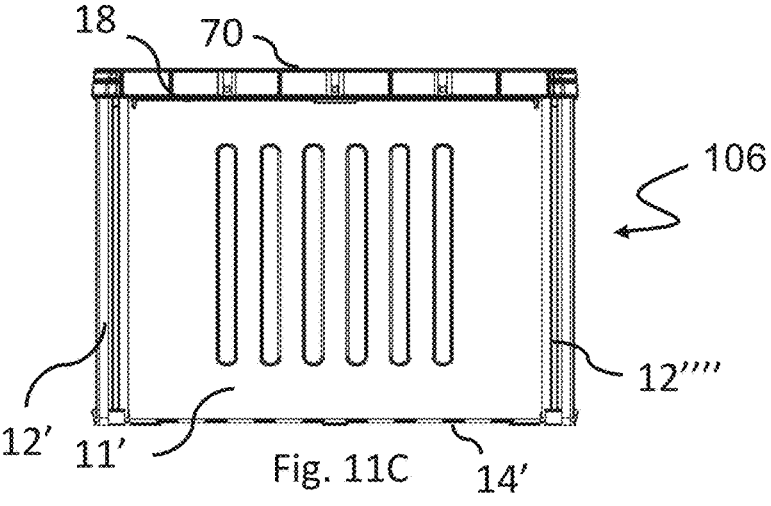
FIG. 11C is a side view of a short side of the storage container according to the second embodiment.

FIG. 11C is a side view of a short side, i.e. the first side 11', of the storage container 106 according to the second embodiment.

Figure 11D:
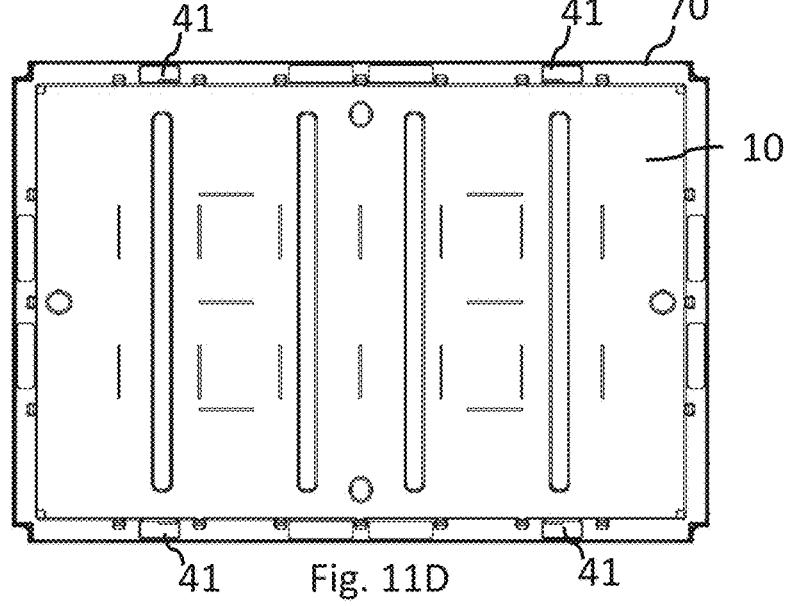
FIG. 11D is a top view of the storage container according to the second embodiment.

FIG. 11D is a top view of the storage container 106 according to the second embodiment.

Figure 11E:
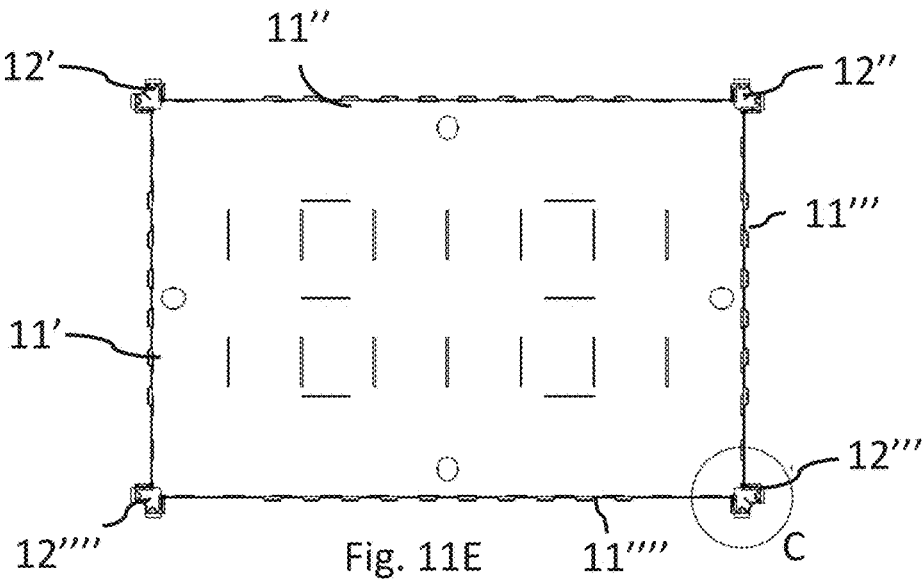
FIG. 11E is a bottom view of the storage container according to the second embodiment.

FIG. 11E is a bottom view of the storage container 106 according to the second embodiment.

Figure 11F:
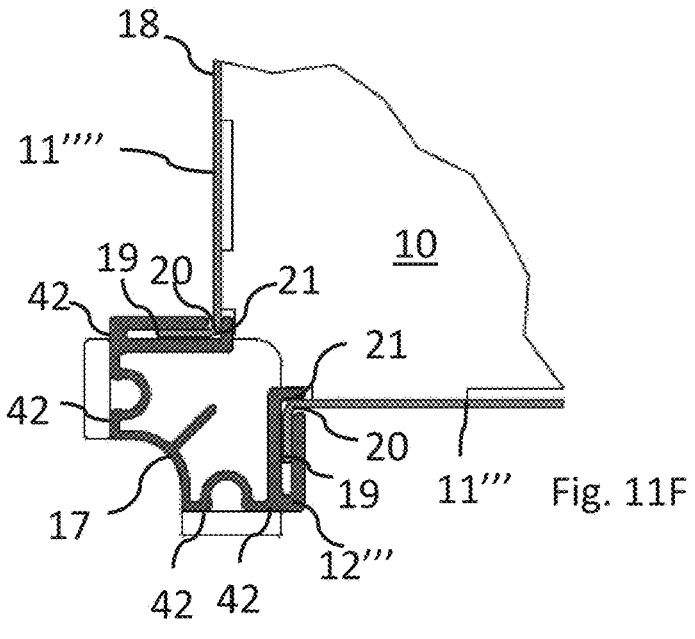
FIG. 11F is a detailed view of section C in FIG. 11E.

FIG. 11F is a detailed view of section C in FIG. 11E. As seen in FIG. 11F, the fourth corner post 12"" is disclosed with a longitudinal indent 17 on an exterior surface. The longitudinal, or vertical, indent 17 assists in enabling that the storage container 106 is able to be lifted by grippers 304 (see FIG. 3) on a lifting device in that bin guides (not shown) of the lifting device can be guided along the indents 17 on the different corner posts 12', 12", 12''', 12"".

The corner post 12''' is further disclosed with outer surface 42 for sliding contact with the upright members 102 of the framework structure 100 (see FIG. 1). If the upright members 102 are formed of aluminium, at least the outer surface 42 of the corner posts 12', 12", 12''', 12"" guided by the upright members 102 shall be coated or formed of another material than aluminium in order to avoid scratching and noise resulting from aluminium sliding against aluminium during lifting and lowering of the storage containers 106 within the framework structure 100.

Figure 11G:
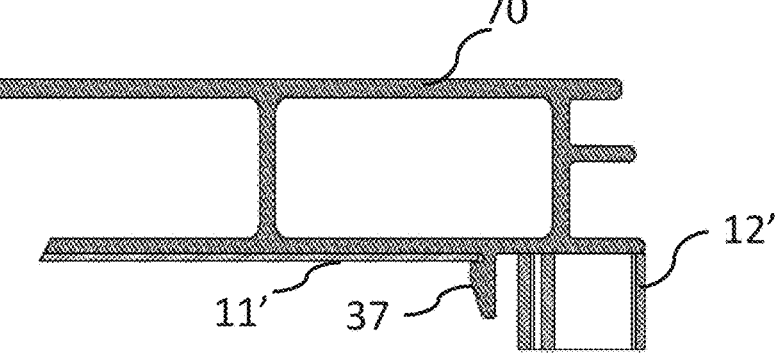
FIG. 11G is a view along line D-D in FIG. 11B.

FIG. 11G is a view along line D-D in FIG. 11B. The locking frame 70 is disclosed with a snap lock connection 37 for locking the corner posts 12'. The snap lock connections 37 extends downwards from an underside of the locking frame 70 into locking contact with recesses 72 on a top edge 18 of the sides 11'-11"" and upper end of the corner posts 12'-12"" (as better illustrated in FIGS. 12B and 12C).

Figures 12A, 12B:
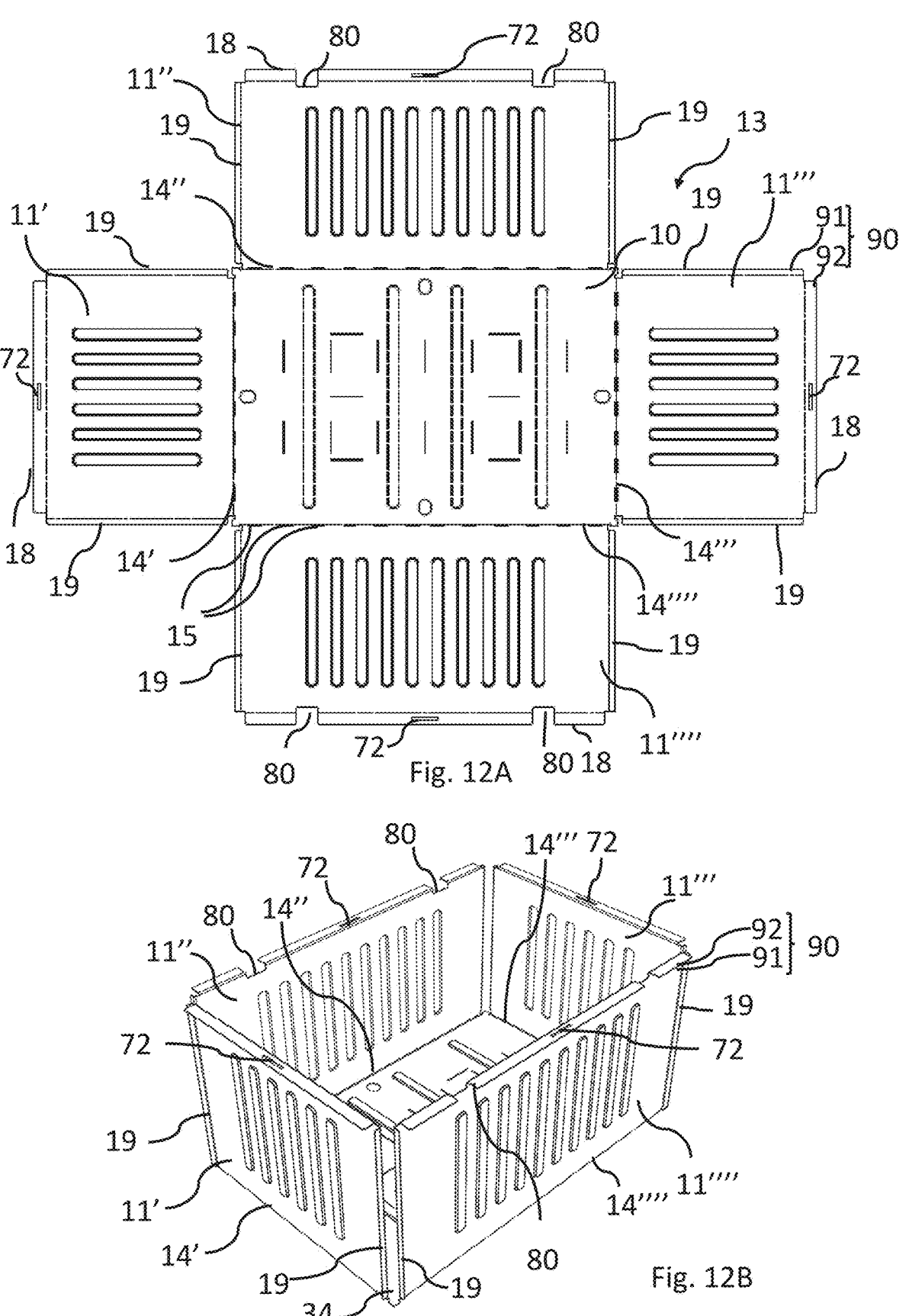
FIG. 12A is a top view of a sheet material forming a base and four sides of the storage container according to the second embodiment.
FIG. 12B is a side perspective view of the sheet material in FIG. 12A where the sides have been folded substantially 90 degrees upwards relative the base.

FIG. 12A is a top view of a sheet material 13 forming a base 10 and four sides 11'-11" of the storage container 106 according to the second embodiment.

FIG. 12A is a top view of a sheet material 13 forming a base 10 and four sides 11', 11", 11''', 11"" of the storage container 106 according to the second embodiment. The sheet material 13 may have been provided as a blank from which the base 10 and four sides 11', 11", 11''', 11"" have been formed. Each of the sides 11', 11", 11''', 11"" are connected to a respective edge 14', 14", 14''', 14"" of the base 10 by a live hinge provided by a line of weakness 14', 14", 14''', 14"". The lines of weakness 14', 14", 14', 14"" extend between each of the sides 11', 11", 11''', 11"" and the base 10 such that the respective sides 11', 11", 11''', 11"" can be folded relative the base 10 along the line of weakness 14', 14", 14''', 14"". In particular, a first line of weakness 14' extends between a first edge of the base 10 and the first side 11', a second line of weakness 14" extends between a second edge of the base 10 and the second side 11", a third line of weakness 14''' extends between a third edge of the base 10 and the third side 11', and a fourth line of weakness 14"" extends between a fourth edge of the base 10 and the first side 11"". As such, the base and the sides can be made from the same material.

The lines of weakness 14', 14", 14''', 14"" can be lines where an amount of the material of the sheet material 13 has been reduced. Alternatively, or in addition, the lines of weakness 14', 14", 14''', 14"" may comprise through-going holes 15. As shown in FIG. 12A, the through-going holes 15 may make up a significant amount of the lines of weakness, for example as illustrated, the through-going holes may make up more than 30% of the lines of weakness 14', 14", 14''', 14"".

As illustrated, in order to simplify folding of the sides 11', 11", 11''', 11"", the lines of weakness 14', 14", 14''', 14"" can be rectilinear lines.

As shown in FIG. 12A, the sheet material 13 may be stamped to provide an outline of the base 10 and the four sides 11', 11", 11''', 11".

The base 10 and sides 11', 11", 11''', 11"" may be formed from a metal sheet material 13, a plastic sheet material 13, a cardboard sheet material 13, a composite sheet material 13 etc. If made of a metal sheet material 13, it may be for example be made of an aluminium sheet material 13 or a steel sheet material 13.

The top edge 18 of the second and fourth sides 11", 11"" are formed with pre-cut slits 80 at the positions of complementary lifting holes 41 in the locking frame 70.

FIG. 12B is a side perspective view of the sheet material in FIG. 12A where the sides 11'-11"" have been folded substantially 90 degrees upwards relative the base 10. In this position, two adjacent sides 11'-11"" form a 90 degrees angle between them. Further, as seen in FIG. 12B, the distance between the side edges of one side 11'-11"" is shorter than a distance between two edges 14'-14"" of the base 10 such that the adjoining side edges of the adjacent sides 11', 11", 11''', 11"" finish short of true geometrical corners of an interior of the storage container 106, forming an opening 34 therebetween.

Now referring to FIGS. 12A and 12B, the top edge 18 of the storage container forms part of a top portion 90 of the sides 11', 11", 11''', 11"". The top portion 90 comprises a main top portion 91 and a folded portion 92. The top edge 18 forms the folded portion 92. The folded portion 92 has been folded outwardly relative the main top portion 91. The folded portion 92 thus forms a flat platform on top of the sides 11'-11"". This configuration strengthens the sides 11'-11"" as they are stiffened by the top portion 90. As such, the risk of buckling of the storage container is reduced.

Figure 12C:
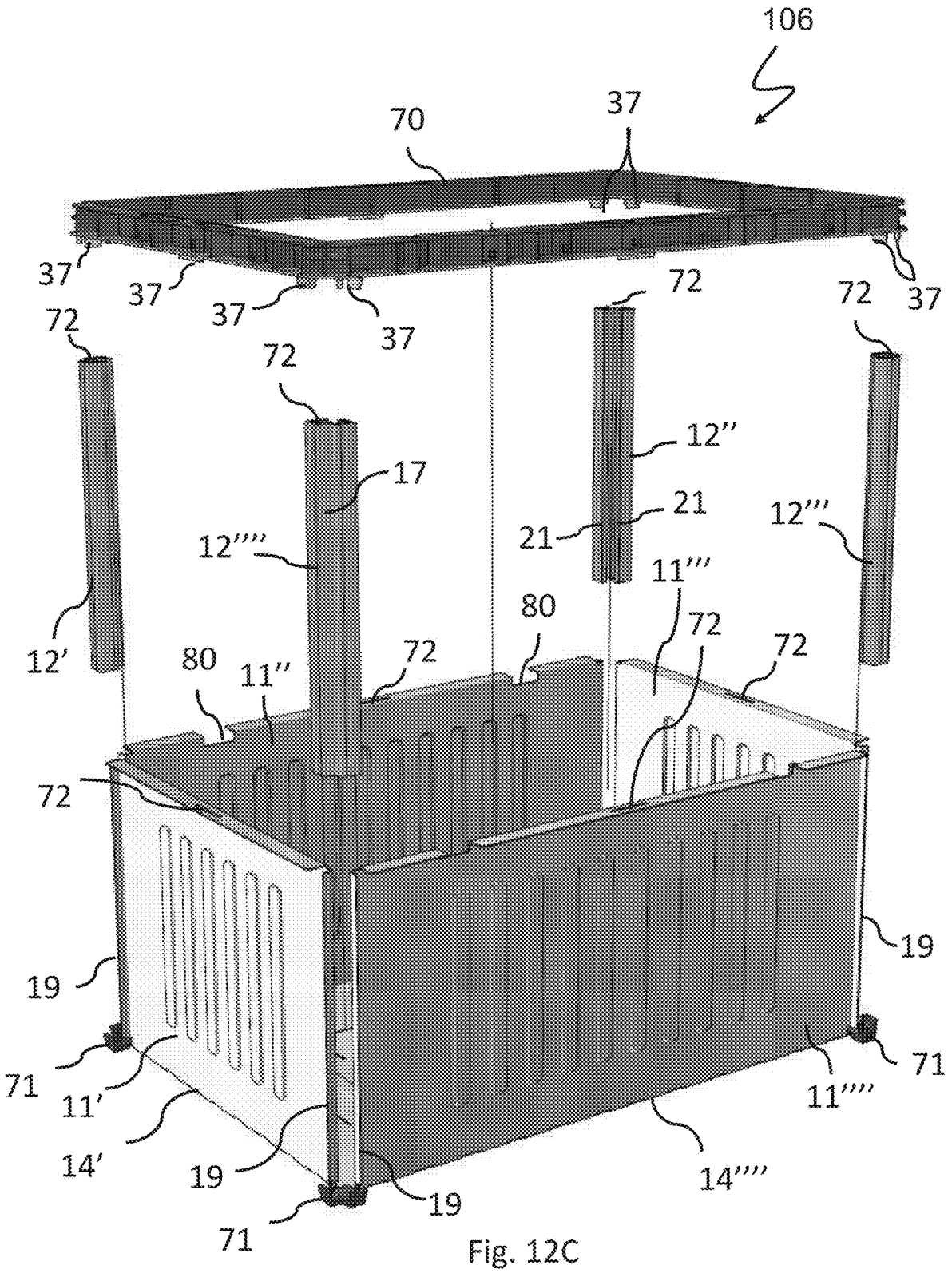
FIG. 12C is an exploded view of corner posts, sides and a locking frame of the storage container according to the second embodiment.

FIG. 12C is an exploded view of corner posts 12'-12"", sides 11'-11"" and a locking frame 70 of the storage container 106 according to the second embodiment. Corner post receptacles 71 for receiving the corner posts 12'-12"" are shown in each corner of the base 10.

Referring to FIGS. 12A, 12B and 12C, each of the sides 11', 11", 11''', 11"" are shown with a top edge 18 and two opposed side edges. Each of the sides 11', 11", 11''', 11"" have been folded forming a fold 20 (not shown in FIGS. 12A-12C, see FIG. 11F) at the side edges to provide an outwardly extending rib 19 at each side edge. Each corner post 12', 12", 12''', 12"" comprises a pair of grooves 21 (see details in FIG. 11F) extending in a longitudinal direction thereof for receiving the respective outwardly extending ribs 19 from a pair of adjacent sides 11', 11", 11''', 11"".

When the top edge 18 has been folded such that the folded top portion 92 is directed upwardly like illustrated in FIG. 12C, the closed locking frame 70 lock all of the top edges 18 of the sides 11', 11", 11''', 11"" and the corner posts 12', 12", 12''', 12" relative each other. The top edges 18 and the corner posts 12', 12", 12''', 12"" may have recesses 72 having their opening oriented upwards and the locking frame 70 may have complementary downwardly oriented protrusions 37 for locking with the recesses 72, thereby snap-locking the locking frame 70 to the sides 11'-11"" and the corner posts 12'-12"".

Figures 13A, 13B, 13C, 13D, 13E:
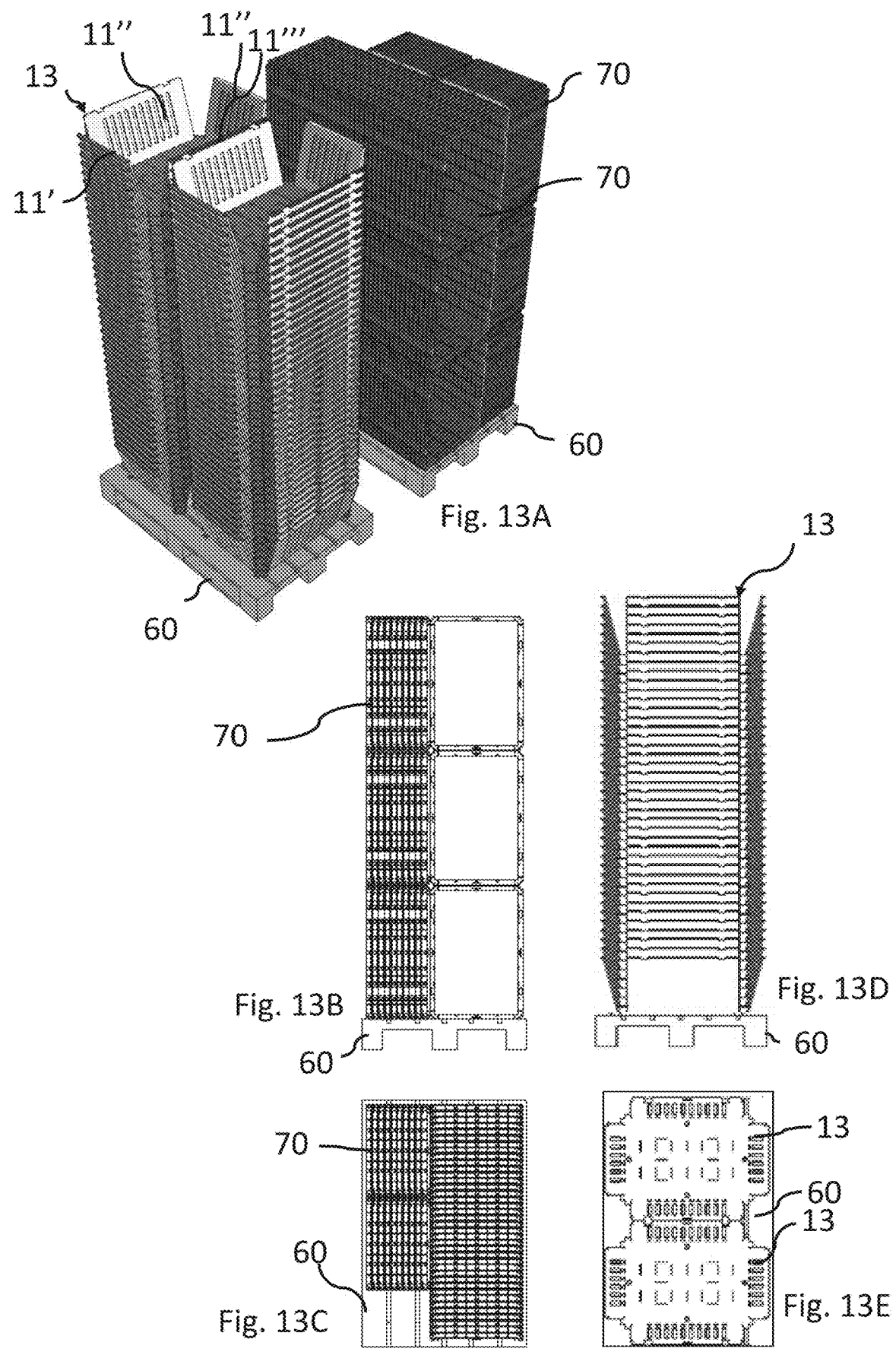
FIG. 13A shows a pallet with two stacks of partially folded sides of sheet material and another pallet with stacked locking frames for transport.
FIG. 13B is a view from the short side of the pallet with stacked locking frames in FIG. 13A.
FIG. 13C is a top view of the pallet with stacked locking frames in FIGS. 13A and 13B.
FIG. 13D is a view from the short side of pallet with stacked partially folded sides of sheet material in FIG. 13A.
FIG. 13E is a top view of the pallet with stacked partially folded sides of sheet material in FIGS. 13A and 13D.

FIG. 13A shows a transport platform in the form of a pallet 60 with two stacks of partially folded sides 11'-11"" of sheet material 13 and another pallet 60 with stacked locking frames 70 positioned thereon. Both pallets 60 being for transport.

FIG. 13B is a view from the short side of the pallet 60 with stacked locking frames 70 in FIG. 13A.

FIG. 13C is a top view of the pallet 60 with stacked locking frames 70 in FIGS. 13A and 13B.

FIG. 13D is a view from the short side of pallet 60 with stacked partially folded sides 11'-11"" of sheet material 13 in FIG. 13A.

FIG. 13E is a top view of the pallet 60 with stacked partially folded sides 11'-11"" of sheet material 13 in FIGS. 13A and 13D. As shown, the two stacks of partially folded sides 11'-11"" of sheet material 13 is within a vertical projection of the base of the pallet 60 thereby making transport efficient.

The storage containers can then be mounted on site in the following steps:

partially folding each of the sides 11', 11", 11''', 11"" relative to the base 10 between 20 and 85 degrees;

stacking the partially folded sides 11', 11", 11''', 11" and bases 10 at least partly into or within each other on the pallet 60;

positioning the corner posts 12', 12", 12''', 12"" on a platform (not shown in FIG. 10);

transporting the stacks of partially folded sides 11', 11", 11''', 11"" and bases 10 and the corner posts 12', 12", 12', 12"" to a site of the ASRS;

assembling the storage containers 106 on site.

The step of assembling the storage containers 106 on site may comprise:

folding the sides 11', 11", 11''', 11" fully so that each extend at 90 degrees from the base 10;

sliding each of the corner posts 12', 12", 12''', 12"" from above into locking engagement with edges of a pair of adjacent sides 11', 11", 11''', 11"".

The final step of assembling the storage container according to the second embodiment may comprise:

locking the locking frame 70 to the sides 11', 11", 11''', 11" and the corner posts 12', 12", 12''', 12"". The locking of the locking frame 70 to the sides 11', 11", 11''', 11"" and the corner posts 12', 12", 12''', 12" may be made via the recesses 72 and the protrusions 37 forming a snap-lock connection 37 therebetween.

In the preceding description, various aspects of the storage container and the automated storage and retrieval system according to the invention have been described with reference to the illustrative first and second embodiments. For purposes of explanation, specific numbers, systems and configurations were set forth in order to provide a thorough understanding of the system and its workings. However, this description is not intended to be construed in a limiting sense. Various modifications and variations of the illustrative embodiment, as well as other embodiments of the system, which are apparent to persons skilled in the art to which the disclosed subject matter pertains, are deemed to lie within the scope of the present invention.

LIST OF REFERENCES

| | |
|---|---|
| 1 | Prior art automated storage and retrieval system |
| 10 | Base |
| 11' | First side |
| 11" | Second side |
| 11''' | Third side |
| 11"" | Fourth side |
| 12' | First corner post |
| 12" | Second corner post |
| 12''' | Third corner post |
| 12"" | Fourth corner post |
| 13 | Sheet material |

-continued

| | |
|---|---|
| 14' | First line of weakness/Edge of base |
| 14" | Second line of weakness/Edge of base |
| 14''' | Third line of weakness/Edge of base |
| 14"" | Fourth line of weakness/Edge of base |
| 15 | Through-going holes |
| 16 | Centerline through-going holes |
| 17 | Longitudinal indent |
| 18 | Top edge |
| 19 | Outwardly extending rib |
| 20 | Fold at side edges |
| 21 | Groove |
| 30 | Flange portion |
| 31 | Main portion |
| 32 | Intermediate portion |
| 33 | Outer portion |
| 34 | Opening |
| 35 | Locking hole |
| 36 | Pin member |
| 37 | Snap lock connection/protrusion |
| 39 | Gap |
| 40 | Indentation |
| 41 | Lifting hole |
| 42 | Abutting ends |
| 43 | Inlet |
| 44 | Outlet |
| 50 | Divider |
| 51 | Projection |
| 52 | Slot |
| 60 | Transport platform/Pallet |
| 70 | Locking frame |
| 71 | Corner post receptacle |
| 72 | Recess |
| 80 | slit |
| 90 | Top portion |
| 91 | Main top portion |
| 92 | Folded top portion |
| 100 | Framework structure |
| 102 | Upright members of framework structure |
| 103 | Horizontal members of framework structure |
| 104 | Storage grid |
| 105 | Storage column |
| 106 | Storage container |
| 106' | Particular position of storage container |
| 107 | Stack |
| 108 | Rail system |
| 110 | Parallel rails in first direction (X) |
| 110a | First rail in first direction (X) |
| 110b | Second rail in first direction (X) |
| 111 | Parallel rail in second direction (Y) |
| 111a | First rail of second direction (Y) |
| 111b | Second rail of second direction (Y) |
| 112 | Access opening |
| 119 | First port column |
| 120 | Second port column |
| 201 | Prior art container handling vehicle |
| 201a | Vehicle body of the container handling vehicle 201 |
| 201b | Drive means/wheel arrangement, first direction (X) |
| 201c | Drive means/wheel arrangement, second direction (Y) |
| 301 | Prior art cantilever container handling vehicle |
| 301a | Vehicle body of the container handling vehicle 301 |
| 301b | Drive means in first direction (X) |
| 301c | Drive means in second direction (Y) |
| 304 | Gripping device |
| 500 | Control system |
| A | Section |
| C | Section |
| D | Line |
| G | Section |
| M | Line |
| P | Horizontal plane |
| W | Water |
| X | First direction |
| Y | Second direction |
| Z | Third direction |
| α | Angle relative horizontal plane |

The invention claimed is:

1. A storage container for an automated storage and retrieval system, ASRS, the storage container being configured to be stacked in a stack of storage containers where an underlying storage container supports the storage container(s) positioned above, the storage container being adapted to be lifted by grippers on a lifting device such that the storage container can be lifted from above, wherein the storage container comprises:

a base;

four sides each hingedly connected to an edge of the base; and four corner posts each configured to interconnect a pair of adjacent sides to each other in a horizontal direction when the sides are positioned substantially 90 degrees relative the base and relative each other, wherein each of the sides comprises a top edge and two opposed side edges, and wherein each of the sides has been folded forming a fold at the side edges to provide an outwardly extending rib at each side edge, and wherein each corner post comprises a pair of grooves extending in a longitudinal direction thereof for receiving the respective outwardly extending ribs from the pair of adjacent sides.

2. The storage container according to claim 1, wherein the base and sides of the storage container comprises:

a sheet material, the sheet material having been provided as a blank from which the base and four sides have been formed, wherein each of the sides are connected to a respective edge of the base by a live hinge provided by a line of weakness extending between each of the sides and the base such that the respective sides can be folded relative the base along the line of weakness.

3. The storage container according to claim 2, wherein the lines of weakness are lines where an amount of the material of the sheet material has been reduced.

4. The storage container according to claim 2, wherein the lines of weakness comprise through-going holes.

5. The storage container according to claim 4, wherein the through-going holes make up more than 30% of the lines of weakness.

6. The storage container according to claim 4, wherein a cross sectional area of the through-going holes is of a sufficient size for water to flow therethrough.

7. The storage container according to claim 4, wherein through-going holes comprises:

an inlet arranged on an inner surface of the storage container; and an outlet arranged on an outer surface of the storage container; and wherein the inlet is arranged at an elevation equal to or higher than the outlet of the through-going holes.

8. The storage container according to claim 2, wherein the lines of weakness are rectilinear lines.

9. The storage container according to claim 2, wherein the sheet material is stamped to provide an outline of the base and the four sides.

10. The storage container according to claim 1, wherein the base and sides are formed from a metal sheet material, a plastic sheet material, a cardboard sheet material or a composite sheet material.

11. The storage container according to claim 10, wherein the base and sides are formed from aluminium or steel.

12. The storage container according to claim 1, wherein the corner posts are of at least the same height as the height of the sides.

13. The storage container according to claim 1, wherein an upper end of the corner posts is at the same level or above an upper end of the sides.

14. The storage container according to claim 1, wherein a lower end of the corner posts is at the same level or below a lower end of the sides.

15. The storage container according to claim 1, wherein the corner posts are formed from a plastic material.

16. The storage container according to claim 1, wherein the corner posts comprise a longitudinal indent on an exterior surface thereof.

17. The storage container according to claim 1, wherein a distance between the side edges of one side is shorter than a distance between two edges of the base such that adjoining side edges of the adjacent sides finish short of true geometrical corners of an interior of the storage container.

18. The storage container according to claim 1, wherein the top edge forms part of a flange portion of the sides, wherein the corner post comprises a snap lock connection for locking the corner post to the flange portion.

19. The storage container according to claim 18, wherein the flange portion comprises a main portion, an intermediate portion and an outer portion, wherein the top edge form an upper end of the outer portion.

20. The storage container according to claim 19, wherein, the intermediate portion has been folded outwardly relative the main portion and the outer portion has been folded upwardly relative the intermediate portion.

21. The storage container according to claim 19, wherein the main portion and the outer portion are substantially parallel.

22. The storage container according to claim 19, wherein a cross sectional area formed by the outer portions of the sides are larger in all directions than the base and consequently through-going holes of the base of a storage container supported directly above, such that any water flowing through the through-going holes of the storage container above is guided into the storage container via the outer portions, the intermediate portion and the main portion of the flange portion.

23. The storage container according to claim 1, wherein the top edge has been folded forming a folded portion, and wherein the storage container further comprises a closed locking frame for locking all of the top edges of the sides and the corner posts relative each other.

24. The storage container according to claim 23, wherein the top edges and the corner posts comprise recesses having their opening oriented upwards and the locking frame comprises complementary downwardly oriented protrusions for locking with the recesses.

25. An automated storage and retrieval system comprising a two-dimensional rail system comprising a first set of parallel rails arranged to guide movement of container handling vehicles in a first direction across a top of a frame structure, and a second set of parallel rails arranged perpendicular to the first set of parallel rails to guide movement of the container handling vehicles in a second direction which is perpendicular to the first direction, wherein a plurality of container handling vehicles operate on the rail system, and wherein the system comprises one or more storage container(s) configured to be stacked in a stack of storage containers where an underlying storage container supports the storage container(s) positioned above, the storage container being adapted to be lifted by grippers on a lifting device such that the storage container can be lifted from above, wherein the storage container comprises:

a base;

four sides, each hingedly connected to an edge of the base; and four corner posts, each configured to interconnect a pair of adjacent sides to each other in a horizontal direction when the sides are positioned substantially 90 degrees relative the base and relative each other, wherein each of the sides comprises a top edge and two opposed side edges, and wherein each of the sides has been folded forming a fold at the side edges to provide an outwardly extending rib at each side edge, and wherein each corner post comprises a pair of grooves extending in a longitudinal direction thereof for receiving the respective outwardly extending ribs from the pair of adjacent sides.

26. A method of transporting a storage container and assembling the storage container on-site, wherein the storage container comprises:

a base;

four sides, each hingedly connected to an edge of the base; and four corner posts, each configured to interconnect a pair of adjacent sides to each other in a horizontal direction when the sides are positioned substantially 90 degrees relative the base and relative each other, wherein each of the sides comprises a top edge and two opposed side edges, and wherein each of the sides has been folded forming a fold at the side edges to provide an outwardly extending rib at each side edge, and wherein each corner post comprises a pair of grooves extending in a longitudinal direction thereof for receiving the respective outwardly extending ribs from the pair of adjacent sides; and, wherein the method comprises:

partially folding each of the sides relative to the base between 20 and 85 degrees;

stacking the partially folded sides and bases at least partly into or within each other on a common transport platform;

positioning the corner posts on a platform;

transporting stacks of partially folded sides and bases and the corner posts to a site of an automated storage and retrieval system, ASRS;

assembling the storage containers on site.

27. The method according to claim 26, wherein the step of assembling the storage containers on site comprises:

folding the sides fully so that each extend at 90 degrees from the base;

sliding each of the corner posts from above into locking engagement with edges of the pair of adjacent sides.

28. The method according to claim 27, wherein the top edge forms part of a flange portion of the sides, wherein the corner post comprises a snap lock connection for locking the corner post to the flange portion, and the method further comprises:

snap locking the corner posts to a flange portion of the storage container such as to bring the corner posts into the locking engagement with the side edges of the adjacent sides.

29. The method according to claim 27, wherein the top edge has been folded, and wherein the storage container further comprises a closed locking frame for locking all of the top edges of the sides and the corner posts relative each other, the method comprises:

locking the locking frame to the sides and the corner posts.

30. The method according to claim 29, wherein the top edges and the corner posts comprise recesses having their opening oriented upwards and the locking frame comprises complementary downwardly oriented protrusions for locking with the recesses, and wherein the method comprises:

locking the locking frame to the sides and the corner posts via the recesses and the protrusions.

31. A method of assembling a storage container on a site of an automated storage and retrieval system, ASRS, the storage container configured to be stacked in a stack of storage containers where an underlying storage container supports the storage container(s) positioned above, the storage container being adapted to be lifted by grippers on a lifting device such that the storage container can be lifted from above, wherein the storage container comprises:

a base;

four sides, each hingedly connected to an edge of the base; and four corner posts, each configured to interconnect a pair of adjacent sides to each other in a horizontal direction when the sides are positioned substantially 90 degrees relative the base and relative each other, wherein each of the sides comprises a top edge and two opposed side edges, and wherein each of the sides has been folded forming a fold at the side edges to provide an outwardly extending rib at each side edge, and wherein each corner post comprises a pair of grooves extending in a longitudinal direction thereof for receiving the respective outwardly extending ribs from the pair of adjacent sides; wherein the method comprises:

folding each of the sides fully so that each extend at 90 degrees from the base;

sliding each of the corner posts from above into locking engagement with edges of the pair of adjacent sides;

snap locking the corner posts to a flange portion of the storage container such as to bring the corner posts into the locking engagement with the edges of the adjacent sides.

* * * * *